(12) United States Patent
van Ginneken

(10) Patent No.: US 6,453,446 B1
(45) Date of Patent: Sep. 17, 2002

(54) TIMING CLOSURE METHODOLOGY

(75) Inventor: Lukas P. P. P. van Ginneken, San Jose, CA (US)

(73) Assignee: Magma Design Automation, Inc., Palo Alto, CA (US)

( * ) Notice: Subject to any disclaimer, the term of this patent is extended or adjusted under 35 U.S.C. 154(b) by 0 days.

(21) Appl. No.: 09/054,379

(22) Filed: Apr. 2, 1998

Related U.S. Application Data

(60) Provisional application No. 60/068,827, filed on Dec. 24, 1997.

(51) Int. Cl.$^7$ ................................................ G06F 17/50
(52) U.S. Cl. ...................... 716/3; 716/2; 716/6; 716/9
(58) Field of Search .............................. 716/19, 8, 6, 9, 716/2, 3; 703/19; 713/503

(56) References Cited

U.S. PATENT DOCUMENTS

| | | |
|---|---|---|
| 5,168,455 A | 12/1992 | Hooper |
| 5,237,514 A | 8/1993 | Curtin |

(List continued on next page.)

FOREIGN PATENT DOCUMENTS

| | | |
|---|---|---|
| EP | 0 610 626 A2 | 8/1994 |

OTHER PUBLICATIONS

"Prioritizing factor for nets in timing–based physical design of VLSI chips," IBM Technical Disclosure Bulletin, vol. 33, No. 6B, Nov. 1, 1990, pp. 1–3.

Jones, D.I.; Goesmann, F.; "Photo–thermoelectric power of a–Si as a function of incident wavelength," Journal of Non–Crystalline Solids, vol. 198–200, No. Part 01, May 1996, pp. 210–213.

K.Keutzer, DAGON: Technology Binding and Local Optimization by DAG Matching, *Proc.of the 24th ACM/IEEE Design Automation Conference*, Miami Beach, Fl (Jun. 1987), pp. 341–347, IEEE Computer Society Press 1987.

Grodstein,J.; Lehman,E.; Harkness,H.; Grundmann,B.; Watanabe,Y., "A Delay Model for Logic Synthesis of Continuously–sized Networks," *Digest Int.Conf. on Computer Aided Design*, pp. 458–462, San Jose, Nov. 5–9, 1995.

Lehman,E.; Watanabe, Y.; Grodstein,J.; Harnkess,H.; Logic Decomposition during Technology Mapping, *Digest Inf. .Conf. on Computer Aided Design*, pp. 264–271, San Jose, Nov. 5–9, 1995.

(List continued on next page.)

*Primary Examiner*—Matthew Smith
*Assistant Examiner*—Jibreel Speight
(74) *Attorney, Agent, or Firm*—Pillsbury Winthrop LLP

(57) ABSTRACT

An automated method for designing an integrated circuit layout using a computer based upon an electronic circuit description and based upon cells which are selected from a cell library, each of the cells having an associated area, comprising the steps of: (a) placing each of the cells in the integrated circuit layout so that the cells can be coupled together by wires to form a circuit path having an associated predetermined delay constraint wherein the cells are coupled together based upon the electronic circuit description input to the computer; (b) connecting the cells together with the wires to form the circuit path; and (c) adjusting an area of at least one of the cells to satisfy the associated predetermined delay constraint of the circuit path.

54 Claims, 14 Drawing Sheets

U.S. PATENT DOCUMENTS

| | | | |
|---|---|---|---|
| 5,282,148 A | | 1/1994 | Poirot et al. |
| 5,392,221 A | | 2/1995 | Donath et al. |
| 5,397,749 A | | 3/1995 | Igarashi |
| 5,402,357 A | | 3/1995 | Schaefer et al. |
| 5,404,312 A | | 4/1995 | Tawada |
| 5,416,718 A | | 5/1995 | Yamazaki ................ 716/5 |
| 5,426,591 A | | 6/1995 | Ginetti et al. |
| 5,452,225 A | * | 9/1995 | Hammer ................ 703/19 |
| 5,459,673 A | * | 10/1995 | Carmean et al. ............ 716/6 |
| 5,475,605 A | | 12/1995 | Lin |
| 5,475,607 A | | 12/1995 | Apte et al. .............. 364/489 |
| 5,490,268 A | | 2/1996 | Matsunaga |
| 5,508,937 A | * | 4/1996 | Abato et al. ............... 716/6 |
| 5,537,330 A | | 7/1996 | Damiano et al. |
| 5,550,748 A | | 8/1996 | Xiong |
| 5,572,717 A | | 11/1996 | Pedersen |
| 5,581,473 A | | 12/1996 | Rusu et al. |
| 5,619,418 A | | 4/1997 | Blaauw et al. ............ 364/489 |
| 5,629,860 A | | 5/1997 | Jones et al. |
| 5,648,911 A | | 7/1997 | Grodstein et al. ........... 716/18 |
| 5,654,896 A | | 8/1997 | Roetcisoender et al. |
| 5,657,239 A | | 8/1997 | Grodstein et al. |
| 5,663,889 A | | 9/1997 | Wakita |
| 5,666,290 A | | 9/1997 | Li et al. |
| 5,689,432 A | | 11/1997 | Blaauw et al. ............. 716/18 |
| 5,726,902 A | | 3/1998 | Mahmood et al. |
| 5,734,917 A | | 3/1998 | Matsunaga |
| 5,737,236 A | * | 4/1998 | Maziasz et al. ............ 716/8 |
| 5,745,386 A | | 4/1998 | Wile et al. |
| 5,751,593 A | | 5/1998 | Pullela et al. |
| 5,751,596 A | | 5/1998 | Ginetti et al. |
| 5,764,526 A | | 6/1998 | Douceur |
| 5,764,531 A | | 6/1998 | Kojima et al. |
| 5,764,532 A | * | 6/1998 | Patel ........................ 716/9 |
| 5,774,371 A | | 6/1998 | Kawakami |
| 5,778,216 A | | 7/1998 | Venkatesh |
| 5,784,600 A | * | 7/1998 | Doreswamy et al. ....... 713/503 |
| 5,798,935 A | * | 8/1998 | Doreswamy et al. ......... 716/6 |
| 5,949,690 A | * | 9/1999 | Lawman ................... 716/19 |

OTHER PUBLICATIONS

Sutherland,I.; Sproull,R.; "The theory of Logical Effort: Designing for speed on the back of an envelope," *Advanced Research in VLSI*, pp.3–16, UC Santa Cruz, 1991.

Venkat,K.; "Generalized delay optimization of resistive interconnections through an extension of logical effort," *Proc.Int.Symp.on Circuits and Systems*, 1993, vol.3, pp.2106–2109, Chicago, May 3–6, 1993.

* cited by examiner

TIMING CLOSURE METHODOLOGY

REFERENCE TO RELATED APPLICATIONS

This application claims the benefit of U.S. Provisional Application No. 60/068,827 filed Dec. 24, 1997.

FIELD OF THE INVENTION

This invention relates generally to the field of integrated circuit design and more specifically to a methodology for meeting timing constraints in the design of digital circuits.

BACKGROUND OF THE INVENTION

In designing electronic circuits and systems, computer-automated design systems are used for defining and verifying various prototype circuit configurations. As part of the circuit definition, delay constraints are specified by the circuit designer. These delay constraints should be satisfied when the prototype circuit is fabricated.

In conventional approaches to circuit design, the following steps are typically performed:

(1) the load capacitance for each cell in the circuit is estimated using a fanout-based model;

(2) the size of each cell is set to optimize timing of the circuit;

(3) the cells are placed, and the net (wire) lengths of the circuit are estimated;

(4) the wires are routed; and (5) final analysis is made to determine whether timing closure (i.e., satisfaction of timing constraints) is achieved.

In step (2), the sizes of cells within the circuit are chosen and held constant once chosen. The placement algorithm used thereafter will assign different net lengths between cells, and these lengths have conventionally been difficult to predict prior to placement. While net lengths have been estimated prior to placement by use of an estimation function or table which gives the load value of a net based on the number of fanout gates, this estimation function is usually inaccurate. This difficulty in accurately predicting net lengths leads to unpredictable delay effects after cell placement occurs. For example, some nets turn out to be longer in length than expected. These longer nets cause longer delays which prevent satisfaction of timing constraints in the digital circuit. Thus, under the conventional design approach, timing closure is not certain until after placement.

Failure to achieve timing closure after placement leads to additional expenses and other problems for the designer. To correct for failure to achieve timing closure, the designer has the option of fixing the design manually, which is difficult and time consuming because the automatically optimized digital network is not easy to understand. As a second option, the designer may change the Hardware Description Language (HDL) specification and repeat the design process. However, timing closure will again not be certain until after placement. Thus, the design process must again be repeated before the designer can determine if the HDL specification changes were successful in enabling timing closure.

A common method for dealing with inaccurate net load estimates is by estimating the net load at a considerably larger value than typically estimated. Although this method increases the probability of meeting timing constraints after placement, it causes the sizes of the gates to be considerably larger than necessary. Gates which are larger than the necessary size are wasteful in both silicon area and power consumption. This leads to chips which are larger, more expensive to produce, and use more electrical power than necessary.

Another problem with the conventional circuit design approach concerns the timing analysis required during optimization and during placement. The timing analysis performed throughout the conventional circuit design process is very time consuming, and accounts for most of the run time of a conventional circuit design system.

A further disadvantage of the conventional design approach relates to the net length modifications performed by the placement program. Depending on the location chosen for each gate, each net length may be modified. As each net length is modified, the capacitive load of the net will change. As a result, the delays of the gates driving the net will change. Therefore, the delays, which were carefully optimized during the logic design, are very different in value after cell placement, thereby contributing to poor network optimization.

Additionally, most of the progress in the state of the art for digital circuit design can be characterized as increased integration which has led to increasingly complex software systems which are slow, and difficult to design and maintain.

A further disadvantage with conventional design approaches is in the difficulty of iterating between placement and sizing, since the logic synthesis program is often operated by the logic designer who also wrote the HDL specification, but the placement program is often operated by the silicon chip manufacturer, after the design is complete.

One proposal has been made to keep delay constant while expressing size as a linear function of the gate load. See, J. Grodstein, E. Lehman, H. Harkness, B. Grundmann, and Y. Watanabe, "A Delay Model for Logic Synthesis of Continuously-Sized Networks", Digest Int. Conf. On Computer Aided Design, pp. 458–462, San Jose, Calif. Nov. 5–9, 1995. Under this proposal, as the gate load changes, the gate size automatically grows sufficiently to hold the delay constant.

The constant delay model has been proposed in a mapping algorithm. See, E. Lehman, Y. Watanabe, J. Grodstein, and H. Harkness, "Logic Decomposition During Technology Mapping", Digest Int. Conf. On Computer Aided Design, pp. 264–271, San Jose, Calif. Nov. 5–9, 1995. However, this proposal does not provide a good method for choosing the constant delays and, in addition, it only applies the constant delay model to mapping.

Similarly, the constant delay model is proposed for fanout optimization. See, K. Kodandapani, J. Grodstein, A. Domic, and H. Touati, "A Simple Algorithm For Fanout Optimization Using High Performance Buffer Libraries", Digest Int. Conf. On Computer Aided Design, pp. 466–471, Santa Clara, Nov. 7–11, 1993. While the above-mentioned references note the importance of the constant delay model, they do not note the importance of gain, also termed "electrical effort".

In Sutherland and R. Sproull, "The Theory of Logical Effort: Designing for Speed on the Back of an Envelope", Advanced Research in VLSI, pp. 3–16, University of California, Santa Cruz, 1991, the delay is noted as being dependent on gain. A size independent formulation of the delay optimization problem is also presented, but the solution is intended for use as imprecise, scratch-pad type calculations, and not part of an overall integrated, automated solution to cell placement in the design of integrated circuits. In V. Kumar, "Generalized Delay Optimization of Resistive Interconnections Through an Extension of Logical Effort, Proc. Int. Symp. On Circuits and Systems, 1993, vol. 3, pp. 2106–2109, Chicago, Ill., May 3–6, 1993, the methods above are used to analyze long wires with a significant amount of RC delay.

In U.S. Pat. No. 5,654,898, a method and apparatus for determining an integrated circuit layout is shown and described whereby timing-driven buffer sizing is performed to satisfy timing requirements. However, this solution also relies on imprecise calculations and does not teach or suggest an overall integrated, automated solution to cell placement in the design of integrated circuits.

What is needed and what has been invented is a method and apparatus for overcoming the foregoing deficiencies, and for maintaining timing closure upon placement and routing of the digital circuit or network.

SUMMARY OF THE INVENTION

The present invention broadly provides a method for designing an integrated circuit layout based upon an electronic circuit description and by using a cell library containing cells that each have an associated relative delay value, comprising the steps of:

(a) selecting a plurality of cells that are intended to be coupled to each other with a plurality of wires and that can be used to implement the digital circuit based on the electronic circuit description;

(b) determining an initial intended location of each of the selected plurality of cells on the integrated circuit, the step of determining the initial intended location of each of the selected plurality of cells including the step of determining an initial intended area of each of the selected plurality of cells, the initial intended area of at least some of the selected plurality of cells being determined using the associated relative delay value of the selected cell and the initial intended lengths of some of the wires coupled to the selected cell;

(c) finalizing the location and area of each of the selected plurality of cells and the lengths of the wires; and (d) routing the digital circuit to generate the integrated circuit layout using the finalized location and area of each of the selected plurality of cells and the finalized wire lengths.

The present invention makes possible an advantage of facilitating the maintenance of timing closure throughout the design process. The invention makes possible another advantage of compensating for the unpredictable delay effects due to the placement and routing steps in the design process.

Still another advantage made possible by the invention is the avoidance of costly timing analysis of conventional approaches. In contrast, timing analysis is required during placement and throughout the conventional design process.

The following are also made possible by the invention by establishing circuit area, instead of timing, as an optimization objective. First, excess circuit area which is formed in one module can be compensated in another module. In contrast, excess timing in one module cannot generally be compensated by another module. Second, area is a measurable parameter when comparing two different circuits. In contrast, it is difficult to compare two circuits for performance advantages, based on timing, since timing may be different for every circuit path. Third, if circuit area is established as a constraint, then routing completion is not guaranteed to be achieved.

DETAILED DESCRIPTION OF THE INVENTION

Those of ordinary skill in the art will realize that the following description of the present invention is illustrative only and not in any way limiting. Other embodiments of the invention will readily suggest themselves to those skilled in the art.

Figure 1:
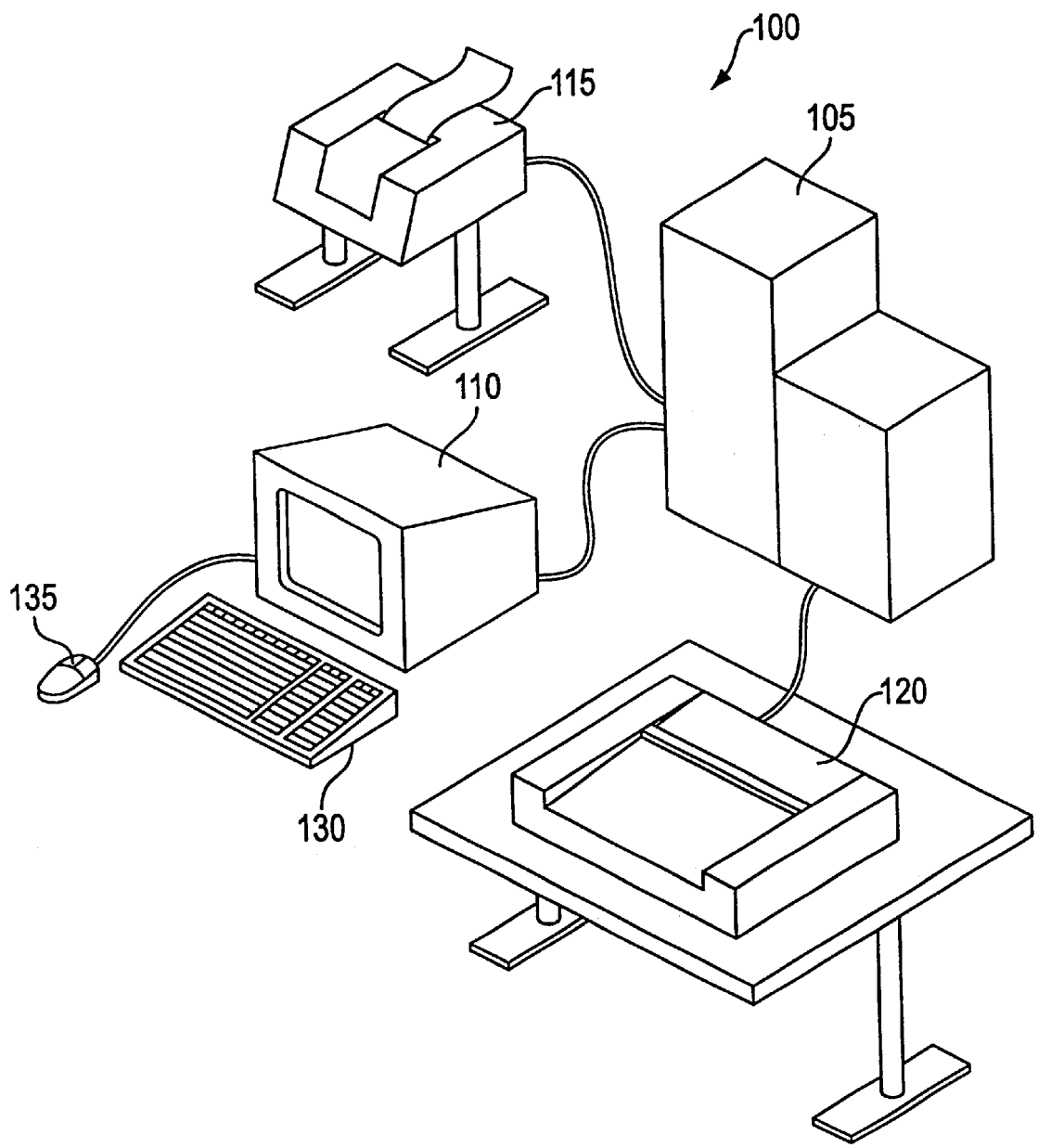
FIG. 1 is a schematic diagram of a host computer system which is capable of implementing the present invention.

Referring in detail now to the drawings wherein similar parts or steps of the present invention are identified by like reference numerals, there is seen in FIG. 1 a schematic diagram of a host computer system 100 which is capable of implementing the present invention. The host computer system 100 preferably includes a computer 105, a display 110, a printer 115 and a plotter 120. The computer 105 is typically a personal computer or workstation. The display 110 displays both graphical and textual materials relating to the design of integrated circuits. Also included in the computer system 100 is a keyboard 130 and a pointing device 135 such as a "mouse". When operating with software tools used in integrated circuit design, the computer system 100 essentially becomes a series of electronic circuits for accomplishing specific design functions. One example of such software tools is the Aquarius which is commercially available from Avant! Corporation of Fremont, Calif.

Figure 2:
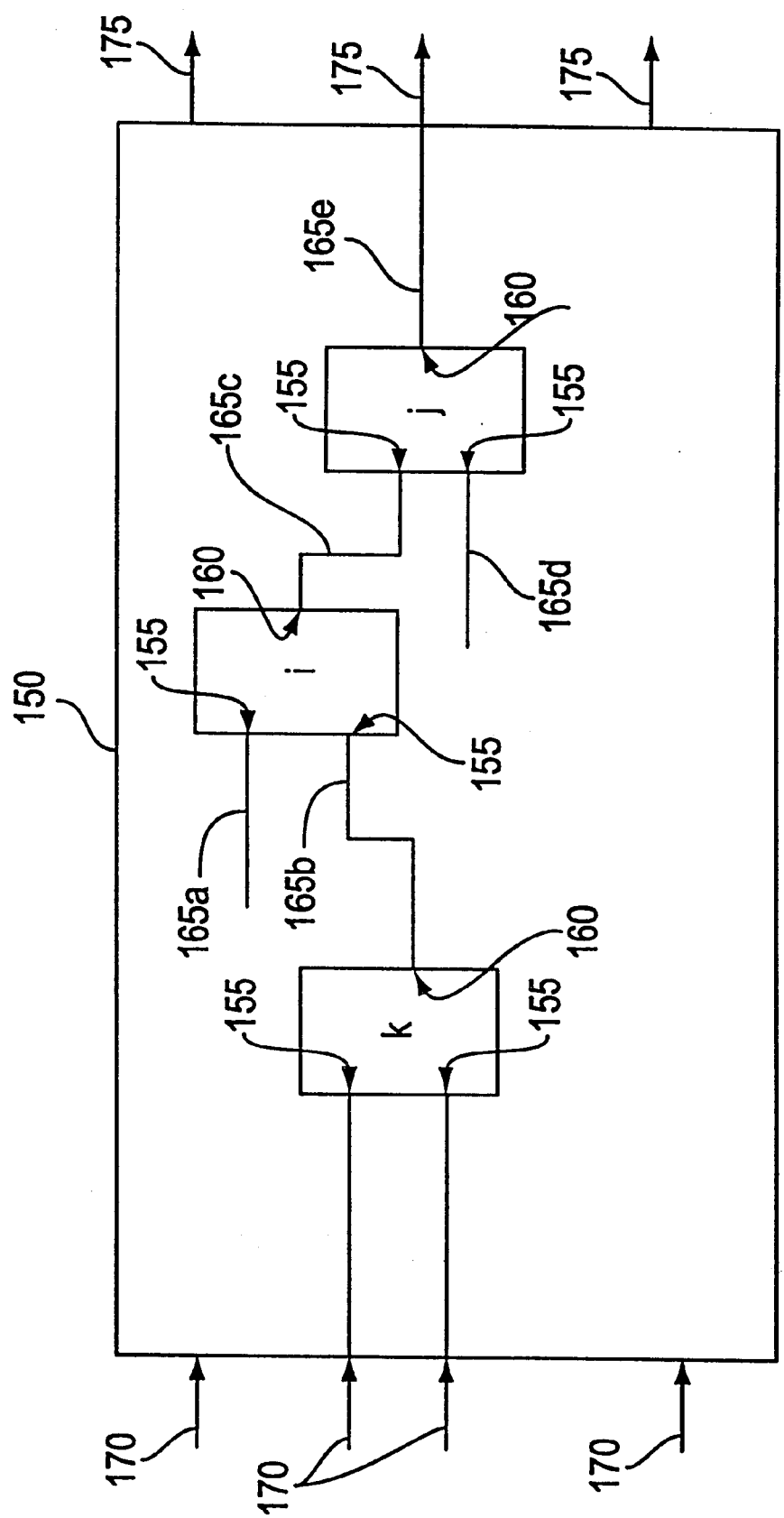
FIG. 2 is a schematic circuit diagram of a combinational network which can be designed by the computer system of FIG. 1.

FIG. 2 shows a portion of a typical integrated circuit 150 which can be designed by the computer system 100 (FIG. 1) and which is provided as additional background material for understanding the present invention. The digital circuit 150 comprises a plurality of gates, including gates i, j, and k. The gates can be combinational gates whose function is represented as Boolean expression based on, for example, the operators AND, OR and NOT. The gates can also be registers.

Each gate (e.g., gate j) has one or more input 155 and a single output 160. The gates in the circuit 150 are coupled together by a plurality of nets. For example, the gate i has a first input connected to a net 165a and a second input connected via net 165b to the output of the gate k. The gate j has a first input connected via net 165c to the output of gate i, a second input connected to the net 165d, and an output connected to the net 165e.

Gates whose outputs are connected to the inputs of a gate are collectively called the "fanin" of the latter gate. Thus, the gate k is in the fanin of the gate i. Gates whose inputs are connected to the output of a gate are collectively called the "fanout" of the latter gate. Thus, the gate j is in the fanout of the gate i.

The digital circuit 150 performs a logic function by processing digital binary input data in a number of cycles. The input data is presented to the digital circuit 150 at the primary inputs 170, and the result of the computation of the digital circuit function is presented at the primary outputs 175. Typically, the computation of the digital circuit function requires one or more cycles. During each cycle, the gate functions are calculated, and the calculation results are stored in registers for use in the next cycle.

Figure 3:
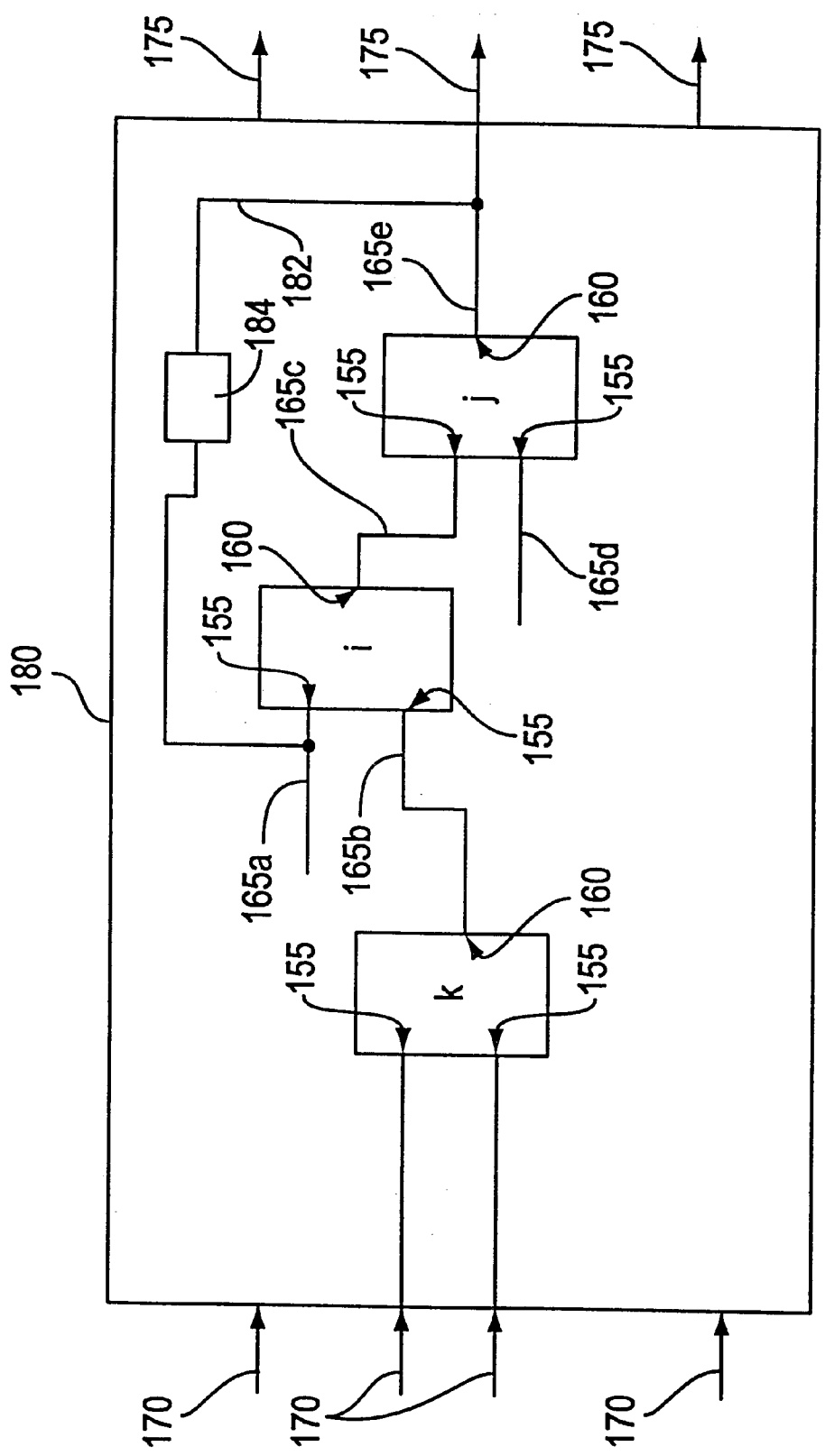
FIG. 3 is a schematic circuit diagram of a sequential network which can be designed by the computer system of FIG. 1.

The circuit 150 of FIG. 2 is known as a combinational network. FIG. 3 is a schematic diagram of a sequential network 180 which can also be designed by the computer system 100 (FIG. 1). In the sequential network 180, the feedback loops typically include at least one register. For example, the feedback loop 182 includes the register 184.

Figure 4:
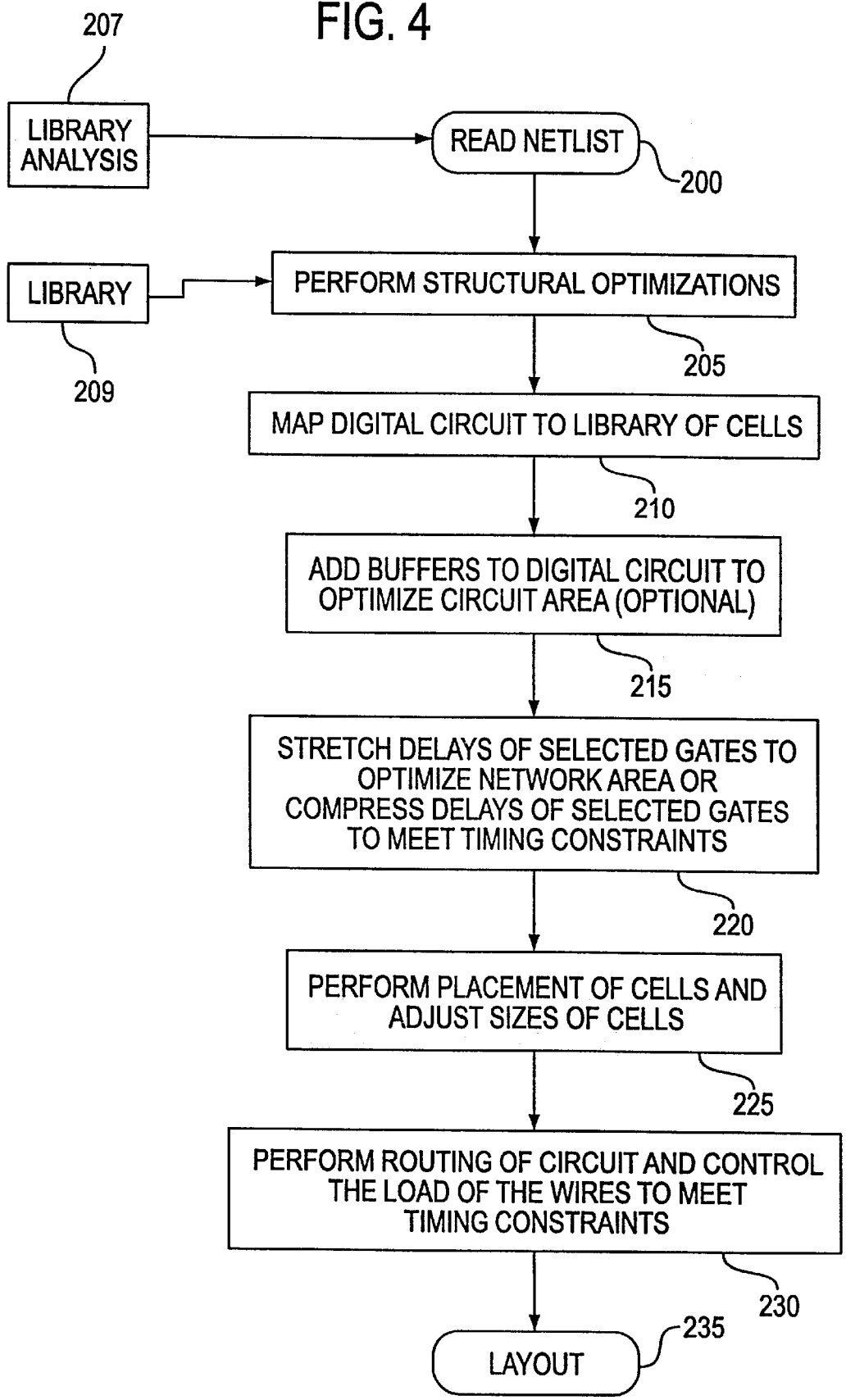
FIG. 4 is a flowchart describing a method of the present invention.

FIG. 4 is a flowchart describing an overview of the automated method of the present invention that is implemented using a computer program containing sequences of instructions that implement each of the various steps described hereinafter. The automated program thus implements a method that includes the following steps below. It is noted further that in the flowchart of FIG. 4, each of the steps has its own distinct computer instructions (i.e., each of the steps 200–230 comprises further steps). In step 200, a netlist generated by synthesis (or other circuit description) is read. In step 205, structural optimizations are performed to reduce the number of connections in the digital circuit, while maintaining the overall circuit function. Additionally, library analysis 207 of library 209 may be performed during, or prior to, step 205. As discussed in further detail below, during the library analysis 207, the delay is determined for each gate to be used in the digital circuit. In step 210, the digital circuit is mapped to the library 209 of cells. In step 215 buffers may be added as an option to the digital circuit to optimize the circuit area. In step 220, "stretching" and/or "compressing" of gate delays may be performed to assist in satisfying the predetermined timing constraints and to optimize the network area. In step 225, cell placement occurs, during which the size of a cell is determined to maintain the constant cell delay characteristics according to the present invention. In step 230, network routing is performed, and the net load of a cell may be adjusted to further tradeoff between timing constraints and circuit area. After step 230, the chip layout is generated (step 235).

Read Netlist

In step 200 (FIG. 4), the invention will read a netlist which is a detailed interconnection listing of boxes in the target technology from which automated logic diagrams may be produced for integrated circuit fabrication. The netlist is typically in Verilog or VHDL format and is generated from synthesis tools such as the Synopsys Design Compiler™ from Synopsys, Inc. or BuildGates™ from Ambit Design Systems, Inc. The synthesis tool performs parsing of the complex Verilog or VHDL constructs which describe the desired logic function. The synthesis tool further performs sequential optimization such as behavioral synthesis, retiming, resource sharing, scheduling, state machine optimization, and register mapping.

Library Analysis

During, or prior to, step 210 in FIG. 4, a library analysis 207 is performed on the library 209 which will be used for the circuit design. Library analysis 207 is not dependent on the actual circuit which is being synthesized and thus can be performed separately from the circuit design process shown in FIG. 4. During the library analysis 207, the delay D is determined for each gate to be used in the digital circuit. Assume a gate in the library 209 has a capacitive load value C and a size value S wherein S is a continuous, positive real variable which linearly increases both the driving capability and area of the gate. The delay D of a gate can be approximated by equation (1):

$$D = f(C/S) \quad (1)$$

The delay D is non-negative and increases as the C/S value increases.

The delay D value depends on the delay provided by a cell plus the delay provided by the net (wire) load of the cell. Thus, in order to ideally maintain the delay D at a constant value prior to and after placement/routing, the net load resistance must be taken into consideration. According to the invention, the gate size is adjusted after cell placement based on changes in the capacitive load in order to maintain D as "constant," as will be described hereinafter in further detail. However, since the wire load also has resistance, the value of D (after gate sizing) may actually vary by a negligible amount from the pre-determined D value. Since this variation is negligible, D may be approximated as "constant" prior to cell placement and after cell placement and gate size adjustment.

The delay D value may also be different for different inputs of the gate and it may also be different for the falling transition and rising transition of a signal propagating through the gate. The C/S value is defined as the "typical load" since it is the load value which can be driven by a gate of size "1". The library analysis will determine a "good" value for C/S for each gate in the library based on gain considerations. It is known to those skilled in the art that to attain maximum gain in a set of series-connected ideal inverters, the gain of each inverter should be e, which is about 2.7. However, an actual inverter is non-ideal and therefore has a parasitic self-load which results in a parasitic delay which is fixed and independent of the size of the inverter and of the load capacitance driven by the inverter. The principal contributors to the parasitic delay are the capacitance of the source/drain regions of the transistors and the Miller capacitance between the source/drain and the gate of transistors which drive the output of the inverter. If this parasitic delay is taken into account, then to obtain maximum gain in the series-connected inverters, the gain of each inverter is set at greater than 2.7, for example about 3.6.

Discussion is now turned to the method of finding the preferred gain of gates other than inverters. For any circuit or network, a good operating point is the point at which a good trade-off between gain and delay can be achieved. To optimize this trade-off, the "continuous buffering assumption" is used which is based on the ideas described in I.E. Sutherland and R. F. Sproull, "The Theory of Logical Effort: Designing for Speed on the Back of an Envelope,"*Advanced Research in VLSI*, pp. 1–16, UC Santa Cruz, 1991.

The method for finding the constant delay is based on a comparison of the gate to an inverter. The method is based on the idea that, at some point, it becomes more advantageous to use a buffer to increase the gain rather than to increase the gain of the gate itself. By adding more buffers, wherein each added buffer is of a larger size than a previously added buffer, the gain of the combination (gate and buffers) can grow exponentially as delay increases.

In the following analysis, it is assumed that continuous buffering can be made whereby it is possible to insert an infinitesimally small amount of buffering. On a given path with several gates, several fractional buffers can be combined into a single real buffer. Thus, for a circuit with many levels of logic, continuous buffering may be achieved approximately or approaches reality.

Assuming continuous buffering can be made, the delay of a series of ideal inverters can be written as $\tau \log(h_{inv})$ wherein $\tau$ is a time constant and $h_{inv}$ is the inverter gain. In other words, the gain of a series of buffers increases exponentially with its delay.

Consideration is now turned to the delay of a gate which is coupled to a series of ideal inverters. As shown in equation (2a), the delay $d_{gate}$ of the gate partly depends on the load of the gate, wherein the load of the gate is the load of the combination ($C_{out}$) divided by the gain $h_{inv}$ of the inverters.

$$d_{gate}=P_{gate}+R_{gate}(C_{out}/h_{inv})+\tau \log (h_{inv}) \quad (2a)$$

The parameter $P_{gate}$ is the intrinsic delay of a gate, while $R_{gate}$ is the gate resistance.

To minimize $d_{gate}$ for a given $C_{out}$, the derivative of $d_{gate}$ (equation (2a)) is taken with respect to $h_{inv}$, and the result is shown by equation (2b).

$$\partial d_{gate}/\partial h_{inv}=(R_{gate}C_{out}/h^2_{inv})+(\tau/h_{inv}) \quad (2b)$$

By setting equation (2b) equal to zero (0), equation (2c) is derived.

$$R_{gate}C_{out}=\tau h_{inv} \quad (2c)$$

At the point where a buffer is not needed, $h_{inv}=1$ and $R_{gate}C_{out}=\tau$. By substituting equation (2c) into equation 2(a), the delay of each gate is the intrinsic delay $P_{gate}$ plus the time constant $\tau$.

The interpretation of using this constant delay is that this delay is the cross-over point between using buffers versus stretching for gain. In other words, the delay of a gate on a critical path should never be slower than this cross-over point value. This provides a clear criterion for dealing with gain or delay optimization problems. If more path gain is required, a buffer is a faster solution than slowing down the gate. Also, use of a buffer will be a more area-efficient solution.

These results above are used as follows. For a given library, the inverter is first analyzed. Using the result that the gain of an inverter should be about 3.6, the typical load $C_{typ}$ is derived as shown by equation (2d):

$$C_{typ}=(3.6)C_{in} \quad (2d)$$

wherein $C_{in}$ is the input capacitance of the inverter. The typical load is used to derive the constant delay for the inverter. Since this is a real, non-ideal inverter, the following rule is applied, as shown in equation (2e).

$$R_{inv}C_{inv}\tau \quad (2e)$$

$R_{inv}$ is determined from a delay equation as represented by equation (2f).

$$R_{inv}=\partial d_{inv}/\partial C_{inv} \quad (2f)$$

Applying the same rule to all gates in the library yields equation (2g).

$$(\partial d_{gate}/\partial c_{gate})\,(C_{gate})=(\partial d_{inv}/\partial C_{inv})(C_{inv}) \quad (2g)$$

Figure 4A:
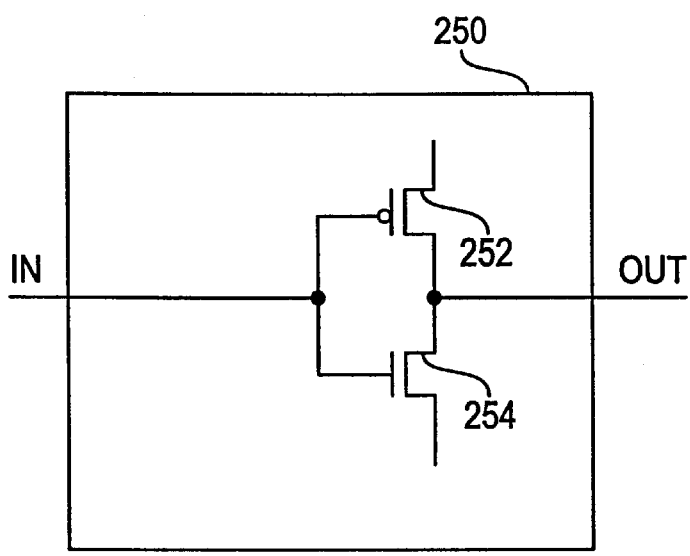
FIG. 4A is a schematic diagram of a real, non-ideal inverter.
Figure 4B:
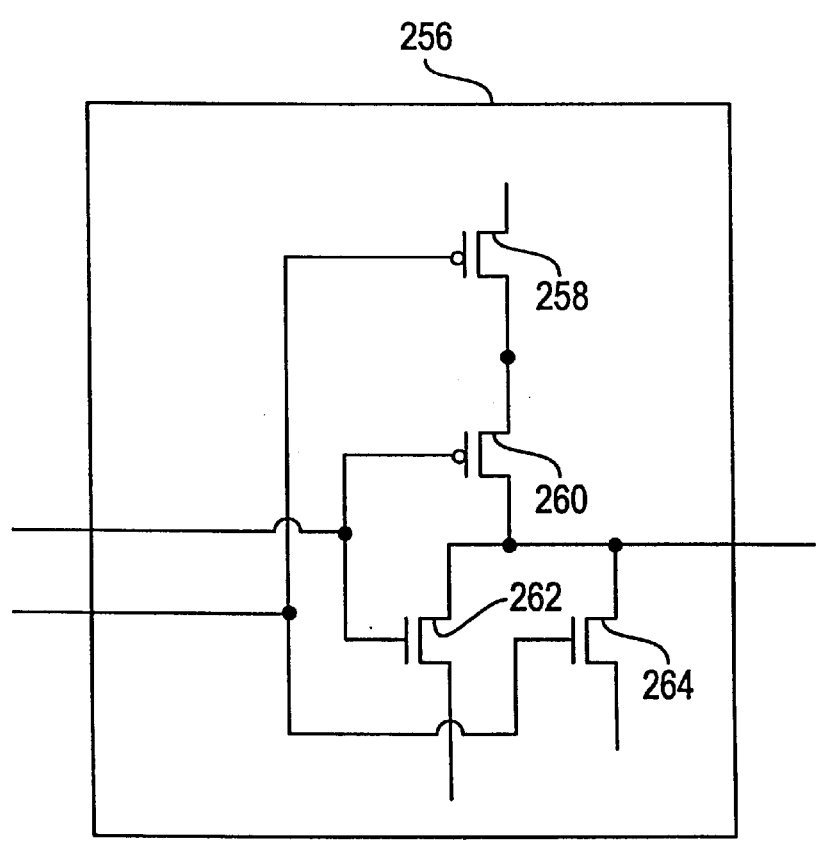
FIG. 4B is a schematic diagram of a NOR gate.

Throughout the following example, as shown in FIGS. 4A and 4B, it is assumed that the resistance $R_{inv}$ for a P-channel transistor is twice as high as the resistance $R_{inv}$ for an N-channel transistor of the same width. Reference is first made to FIG. 4A which shows a schematic diagram of a real, non-ideal inverter 250. The inverter 250 includes the P-channel transistor 252 and the N-channel transistor 254. If it is assumed that the transistors 252 and 254 each have a resistance $R_{inv}$ of 1 unit, then the P-channel transistor 252 has twice the width of the N-channel transistor 254. Assume further that the input capacitance $C_{in}$ of the inverter 250 is 3 units (wherein the N-channel transistor 254 has an input capacitance of 1 unit and the P-channel transistor 252 has an input capacitance of 2 units). The typical load of the inverter 250 can be derived using the fact that the gain of a non-ideal inverter should be about 3.6. Thus, based on equation (2d), the typical load $C_{typ}$ is shown by equation (2h).

$$C_{typ}=(3.6)C_{in}=(3.6)(3)=10.8 \quad (2h)$$

The typical load value $C_{typ}$ can be used to derive the delay of the inverter 250 wherein $R_{inv}=1$ and $\tau=R_{inv}C_{inv}=(1)(10.8)=10.8$.

Referring now FIG. 4B, the NOR gate 256 includes the P-channel transistors 258 and 260 and the N-channel transistors 262 and 264. Assuming all the transistors in FIG. 4B have the same size, then the pull-up resistance is 4 units (through both P-channel transistors 258 and 260) and the pull-down resistance is 1 unit (through either the N-channel transistor 262 or the N-channel transistor 264). The typical load is determined based on equation (2i).

$$R_{gate}C_{typ}=\tau \quad (2i)$$

For the pull-up resistance wherein $R_{gate}=4$ and $\tau=10.8$, equation (2i) leads to $C_{typ}=2.7$. For the pull-down resistance wherein $R_{gate}1$ and $\tau=10.8$, equation (2i) leads to $C_{typ}=10.8$. It is undesirable to have different answers for $C_{typ}$ for the same gate. Since there can only be one real capacitance in the NOR gate 256, a number of options are available. For example, the average between the two $C_{typ}$ values (2.7 and 10.8) may be chosen. Alternatively, the most constraining value for $C_{typ}$ may be chosen. In general, such an unbalanced gate as shown in FIG. 4B cannot be tuned to work well for both the rising and falling transitions of a propagating signal. A large discrepancy indicates a poorly dimensioned gate.

As stated above, each gate has more than one delay equation due to multiple gate inputs. Also, different delay equations may correspond to the rising signal transition and to the falling signal transition.

Structural Optimizations

In step 205 (FIG. 4), the invention performs structural optimizations after reading the netlist from step 200. During this step, the structure of the circuit and the Boolean functions of the gates are changed to reduce the total number of connections, without changing the overall function of the circuit. Structural optimizations can include behavioral optimizations (such as resource sharing), sequential optimizations (such as retiming), algebraic optimizations (such as kernel extraction), and Boolean optimizations (such as redundancy removal). The classes of optimizations above are well known to those skilled in the art.

Mapping

Figure 5:
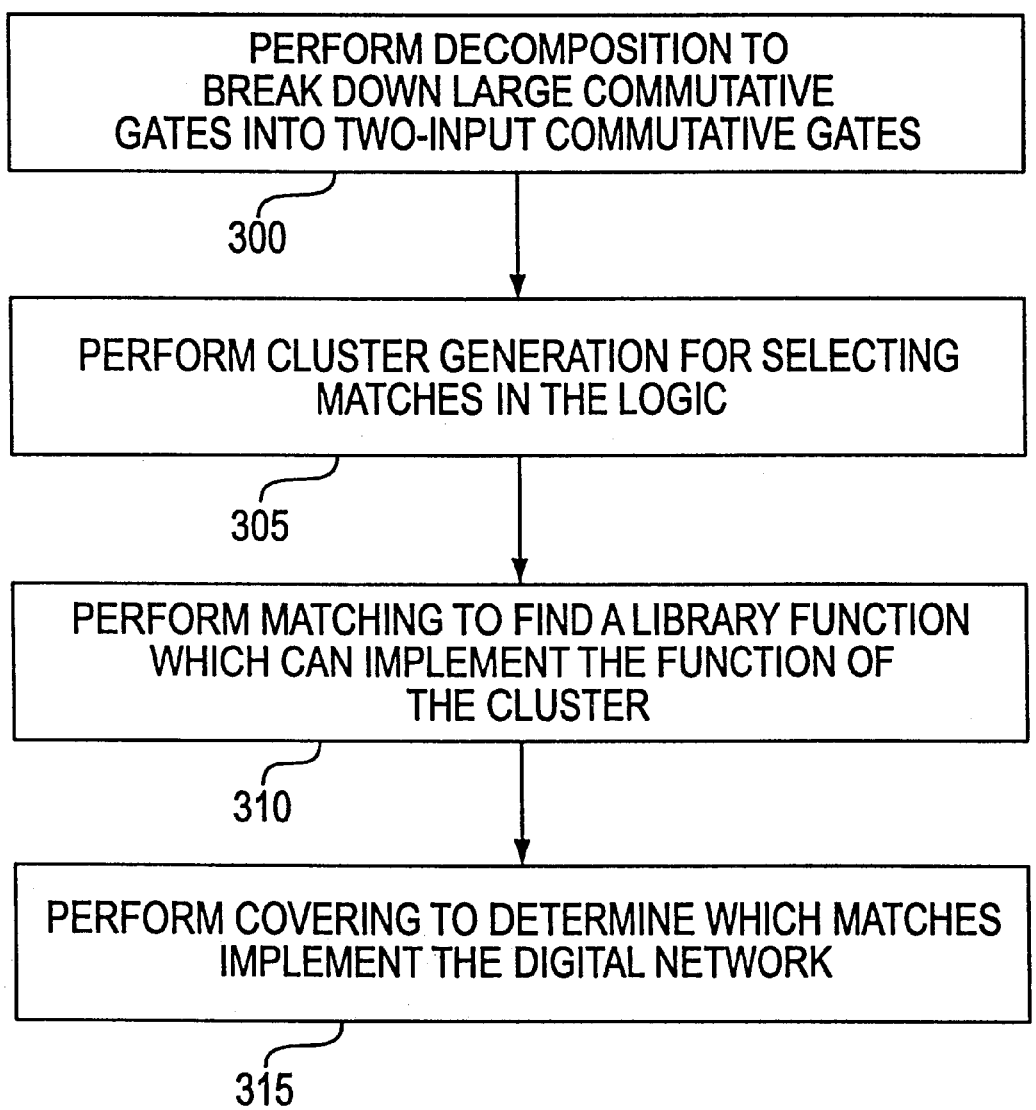
FIG. 5 is a flowchart describing a method of mapping.

In step 210 (FIG. 4), the circuit is mapped to a library 209 of cells. Thus, the logic functions of the circuit gates are implemented with actual cells from the library 209. By mapping, circuit delay and other physical attributes can also be determined. In step 210 of the present invention, a conventional mapping process may be used. FIG. 5 shows the mapping process (step 210) as further including the additional steps of decomposition 300, cluster generation 305, matching 310, and covering 315. The decomposition step 300 breaks down the large commutative gates into two-input commutative gates.

The cluster generation step 305 selects matches in the logic. Clusters with low chance of success are preferably avoided, such that the total number of clusters to match do not grow very large.

The matching step 310 is the process of finding a library function which can implement the function of the cluster. This step is implemented by use of a conventional matching algorithm such as the algorithm described in K. Keutzer, "DAGON: Technology Binding and Local Optimization by DAG Matching", Proceedings of the 24$^{th}$ ACM/IEEE Design Automation Conference, Miami Beach, Fla. (June 1987), pp. 341–347, IEEE Computer Society Press 1987.

The covering step 315 determines which matches are used to actually implement the digital circuit. A timing driven covering method based on dynamic programming may be used in this step. According to this covering method, an implementation of a circuit is chosen from a set of possible implementations based on the arrival time of an implementation. (An arrival time of the data at a gate is computed by taking the maximum arrival time of the fanin gates plus the delay measured from the input pin to the output pin of the gate). An implementation of the circuit with the fastest arrival time may be chosen during the covering step 315. In contrast to the present invention, a conventional mapping process has a disadvantage of not achieving the accurate calculation of "arrival times," since the arrival times depend on the chosen implementations at multi-fanout points. In the conventional process, the chosen implementations at such multi-fanout points are mutually dependent.

Figure 6A:
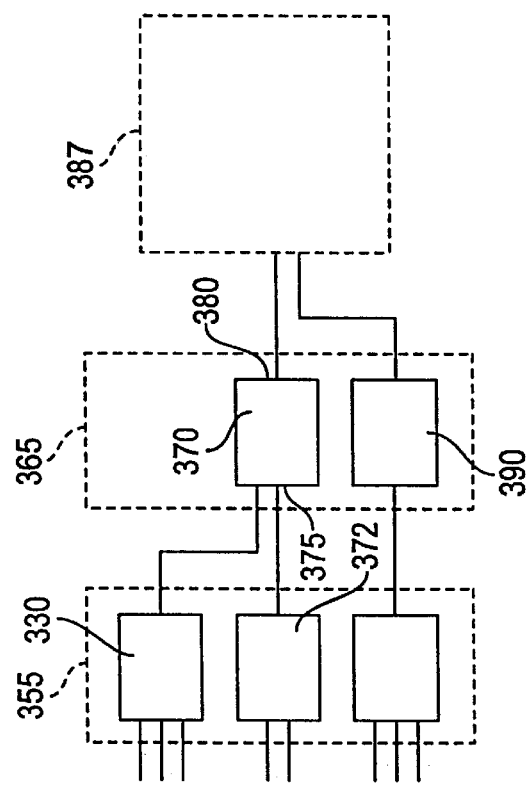
FIG. 6A is a schematic diagram of a portion of a circuit shown for discussion of "arrival" time calculations.
Figure 6B:
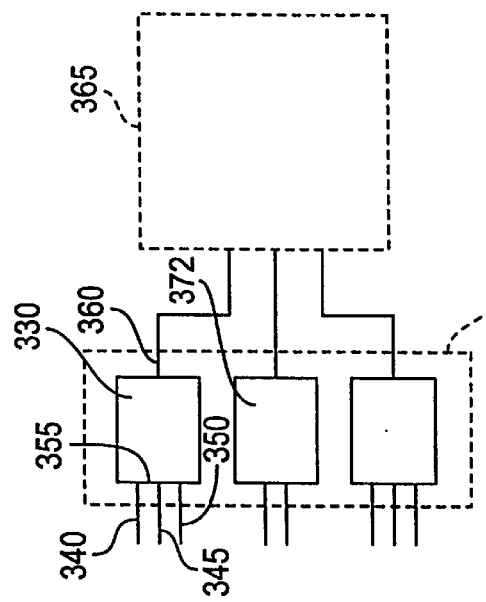
FIG. 6B is a schematic diagram of the circuit of FIG. 6A shown with its next circuit stage.
Figure 6C:
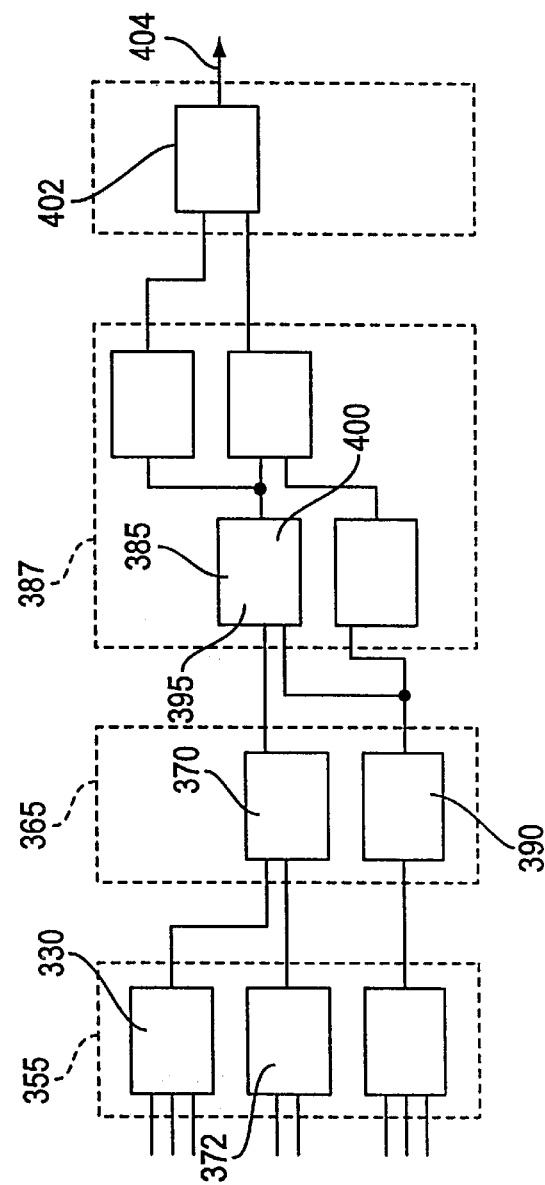
FIG. 6C is a schematic diagram of the circuit of FIG. 6B shown with its next circuit stage.

Discussion is now turned to calculation of the arrival time for an implementation of a circuit according to the present invention. Reference is made to FIGS. 6A–6C which show schematic diagrams of portions of a circuit in order to describe arrival time calculation for a gate. In FIG. 6A, the arrival time for a gate 330 (in stage 335) is determined by the arrival times of its fanin gates (at lines 340, 345 and 350) plus the signal delay from input terminals 355 to the output terminals 360 of the gate 330. The configuration of the fanouts at stage 365 are thus not factored in the arrival time calculation for gate 330. In FIG. 6B, the arrival time for a gate 370 is determined by the arrival times of its fanin gates 330 and 372 plus the delay between input terminal 375 and output terminal 380 of gate 370. Similarly, in FIG. 6C, the arrival time for a gate 385 (in stage 387) is determined by the arrival times of its fanin gates 370 and 390 plus the delay between its input terminal 395 and output terminal 400.

The process above is repeated for the gate 402 which has an output coupled to an output terminal 404. Thus, the arrival time at an output terminal 404 of the circuit of FIGS. 6A–6C can be determined based on the arrival time of the gate 402.

Thus, as shown in FIGS. 6A–6C, in the constant delay approach of the invention, other fanouts of multi-fanouts are irrelevant to the arrival time calculation. The arrival times can thus be computed by traversing the circuit from the inputs to the outputs in a levelized manner. By determining the arrival time for gates on a given path, the total delay of the path in the circuit can be determined.

Level Reduction

Figure 7A:
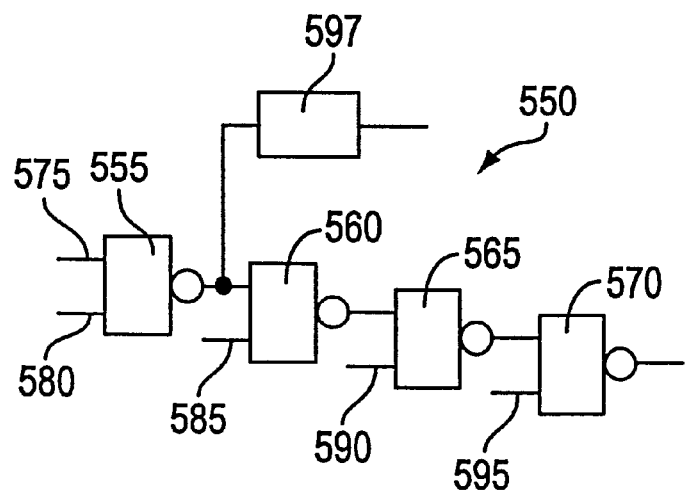
FIG. 7A is a schematic diagram of a gate chain with four levels of logic.
Figure 7B:
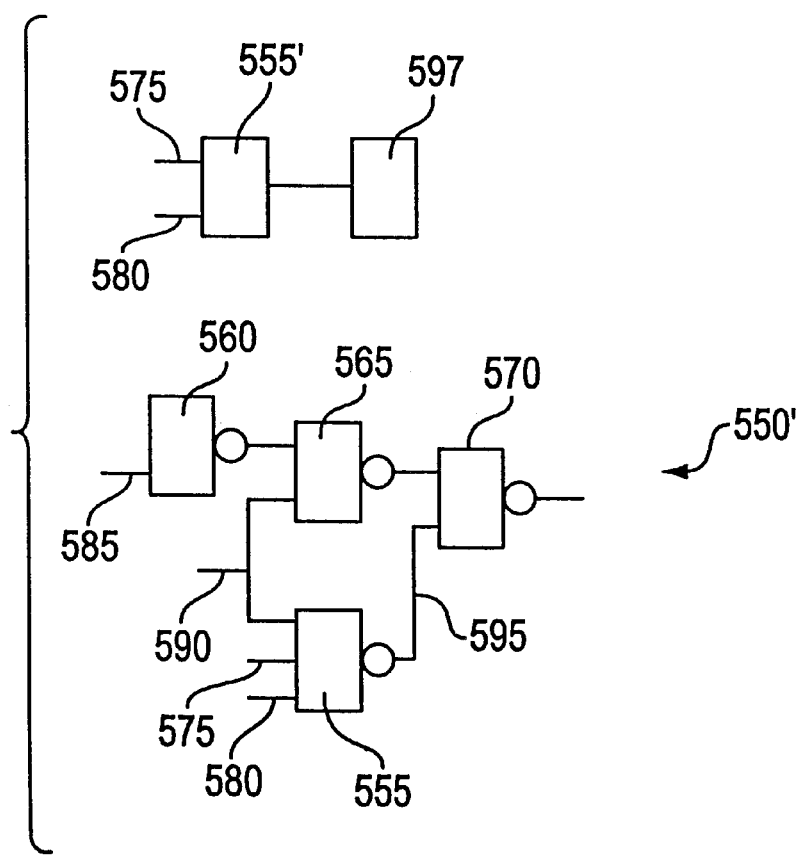
FIG. 7B is a schematic diagram of the gate chain in FIG. 7A after transformation wherein the number of levels of logic is reduced.

Before the cell placement step (step 225 in FIG. 4), it is possible to further revise the circuit than conventionally possible, due to the fact that the delays are held constant. Since the timing constraints are met and the circuit modifications to be made are known, it follows that the effects on delay can be predicted when circuit modifications are made. One specific change or modification which can be made in the mapped circuit is logic level reduction. Reference is made to FIGS. 7A and 7B to illustrate an advantage of using the constant delay model according to the invention. FIG. 7A is a schematic diagram of a gate chain 550 including gates 555, 560, 565, and 570. Initially, the gate 555 has fanins connected at lines 575 and 580. The gates 560, 565 and 570 have fanins connected at lines 585, 590 and 595, respectively. A local transformation is then used to reduce the number of levels in the logic in the gate chain circuit 550. The result of the transformation is shown as gate chain circuit 550' in FIG. 7B. The number of levels in the logic is reduced by bringing the gate 555 forward. In the constant delay model approach, the effect of this transformation can be easily predicted. Changes in the gate loads do not affect delay, since delay is maintained as constant while gate size will be adjusted (during or after placement) to compensate for the load change. The only change which affects delay (of the gate chain circuit 550) is the change of the fanin of gate 555. This delay change can be predicted by simple addition of gate delays provided by the fanins connected at lines 590, 575, and 580 (see gate chain circuit 550' in FIG. 7B).

In order for the transformation shown in FIG. 7B to be valid, it is necessary that gates 555, 560, and 565 are fanout free. If the gates 555, 560, and 565 are not fanout free, then they are made fanout free through copying logic. For example, assume in the circuit 550 (FIG. 7A) that the gate 555 has an additional fanout 597. The gate 555 in the circuit 550' (FIG. 7B) can no longer drive the additional fanout 597 since the gate 555 function may have changed in the circuit 550'. Thus, in the circuit 550', there is provided the copying logic 555' (which is a duplicate of the gate 555 of circuit 550) for driving the fanout 597.

In contrast, a disadvantage of the conventional design approach is as follows. Under conventional logic design, copying logic will increase the load on the gates whose outputs are connected to lines 575, 580, 585, and 590. In the example of FIG. 7B, the copying logic 555' increases the load on the gates whose outputs are connected to lines 575 and 580. To predict whether or not the transformation improved delay, it is necessary to run a complete static timing analysis with accurate delay models. If the transformation (from circuit 550 to 550') were actually harmful to delay, then the transformation would have to be undone.

Area Analysis and Net Weights Calculations

Discussion is first made on area analysis during which sizes of gates of a mapped circuit are calculated. A gate size is calculated by dividing the gate's actual load by the gate's predetermined typical load C/S. As an example, assume the actual load for a given gate i is expressed as $C_i$ wherein $C_i$ is a capacitance measurement of the gate load. The actual load $C_i$ is approximated by equation (3)

$$C_i = \omega_i + \Sigma C_j^*(1/h_{ij}) \qquad (3)$$

The parameter $\omega_i$ represents the net (wire) load for a given gate i (wherein the net load can be estimated using a conventional net load model such as the above-mentioned fanout-based model) plus any other fixed load such as the load of the primary output of the circuit implementation. The parameter $\Sigma C_j^*(1/h_{ij})$ is the input load wherein the subscript j is the fanout gate of the given gate i, and h is the electrical effort between the gates i and j.

Equation (3) can be expressed in matrix notation as shown in equation (4):

$$\bar{c} = \bar{\omega} + (\bar{H})(\bar{c}) \qquad (4)$$

wherein $\bar{H}=[1/h_{ij}]$ which is the matrix of the electrical effort. The parameter $\bar{c}$ is the vector of the gate loads wherein $\bar{c}=[C_i]$ which is the matrix of the gate loads, while $\bar{\omega}$ is the vector of the wire loads $\omega_i$.

According to equations (3) or (4), in order to calculate the size of a given gate i, the size of its fanout gate j must first be calculated, as shown with respect to FIGS. 6A to 6C. The size of the fanout gate j depends on its output capacitive load $C_j$. This dependency on the fanout gates requires performing the gate load calculation downstream of the data flow. If the digital circuit is a combinational network (see, e.g. circuit 150 in FIG. 2), then gate load calculation initiates at the primary outputs 175 and traverses the circuit in a leveled order toward the primary inputs 170.

If the digital circuit is a sequential network (see, e.g., circuit 180 of FIG. 3), then there may be one or more loops (e.g., loop 182) which result in a cyclic dependency (i.e., there is no "rightmost" gate). Gate load calculation can start anywhere in the cycle, and calculation in the cycle is performed several times until the load capacitance values converge or have sufficiently small differences. However, a condition may exist when the load capacitance values do not converge and increase by progressively larger amounts every cycle calculation. This increase in load capacitance values can be detected if the calculated load values exceed a preset maximum value after a fixed number of cycle calculations. When the calculated load values do not converge, then the particular circuit 180 has an infeasible solution, which indicates that the digital circuit is not expected to work at the set speed because the circuit gain is too small. Changes are required to increase the circuit gain, and these changes will usually lead to an increase in circuit delay.

In the above example, the size S of a gate i is determined by dividing the actual load $C_i$ by the predetermined typical load C/S of the gate i. The size S is a scale factor which is applied to all transistor channel widths of a gate in order to determine the area of the "sized gate". The size S is also a scale factor which is used to scale the gate's output load driving capability and its input pin loads.

The area of the sized gate is determined by equation (5).

$$\text{area of sized gate} = S^*(\text{area of gate}) \qquad (5)$$

The area of the mapped digital circuit can be estimated based on the sum of the total areas of the sized gates plus the net area (which is estimated from the total length of all nets in the circuit).

During the mapping step, possible circuit implementations may be evaluated based on net weight calculations. Thus, the following discussion now turns to the calculation of "net weights." The net weight represents the sensitivity of the total area of a digital circuit with respect to the load of a particular net. As an example, the net weight of a given gate, which is immediately coupled to the primary inputs of a digital circuit, is equal to its area per unit load. Using equation (6), the net weight of the other gates in the digital circuit are then calculated in a leveled order towards the primary outputs of the digital circuit.

$$w_i = \partial A/\partial C_i = \partial a_i/C_i + \Sigma w_j^*(1/h_{ij}) \qquad (6)$$

In equation (6), the subscript j represents the fanin gate of a given gate i. The parameter $w_i$ is the net weight of the gate i, while A is the total area of the digital circuit, $a_i$ is the area of the gate i, and $C_i$ is capacitive load of the gate i. As stated above, $h_{ij}$ is the electrical effort between a gate i and j.

Equation (6) can be expressed in matrix notation as shown in equation (7):

$$\bar{w} = \bar{\alpha} + (\bar{H})(\bar{w}) \qquad (7)$$

wherein $\bar{H}=[1/h_{ij}]$, $\bar{\alpha}=[\partial a_i/\partial C_i]$, and $\bar{w}=[w_i]$.

The net weight value from equation (6) can be also used to later calculate the cell area of the cells after the placement step (step 225 in FIG. 4). This cell area is expressed by Equation (8):

$$A = \Sigma(w_i)((\omega_i)) \qquad (8)$$

wherein the parameter $\omega_i$ represents the wire load for a given gate i.

During mapping, the calculated net weight value can be used to determine which matches are used to implement the digital circuit, since the calculated net weight value makes it possible to take into consideration the circuit area. As shown in equation (6), the net weight for a given gate i only depends on the logic of the fanin cone (which was already mapped), wherein the net weight represents the sensitivity of the total area of the circuit with respect to the load on a cell. As further shown in equation (8), the area of a cell increases if its net weight increases. Thus, for example, assume that for a desired circuit function, a first circuit implementation has a higher net weight than the net weight of a second circuit implementation. The first circuit implementation will therefore have a larger area for any possible load than the second implementation. Therefore, disregarding delay, the second circuit implementation is more preferable than the first circuit implementation, even though the area values of both circuit implementations may have not been determined at this stage of the design process.

As shown by the above example, the net weight calculations permit circuit implementation decisions to be made, partly based on the gate area. The net weight calculations permit the area of one cell to be compared relatively to the area of another cell wherein both cells have the same function in the desired digital network. An advantage of the net weight calculations is that when comparing the area of cells, the actual area values of the cells are not required to be known.

Buffering

Prior to cell placement, certain matches may be changed by insertion of buffers in the digital circuit, as shown in step 215 in FIG. 4. Under this step, adding a buffer will increase delay, but also save on area since the source gate can be smaller in size due to a smaller load. Large loads are preferably driven by buffers, particularly when the signal timing is not critical. Buffering allows the source cell to be sized down, thereby resulting in a reduction in circuit area.

Figure 8:
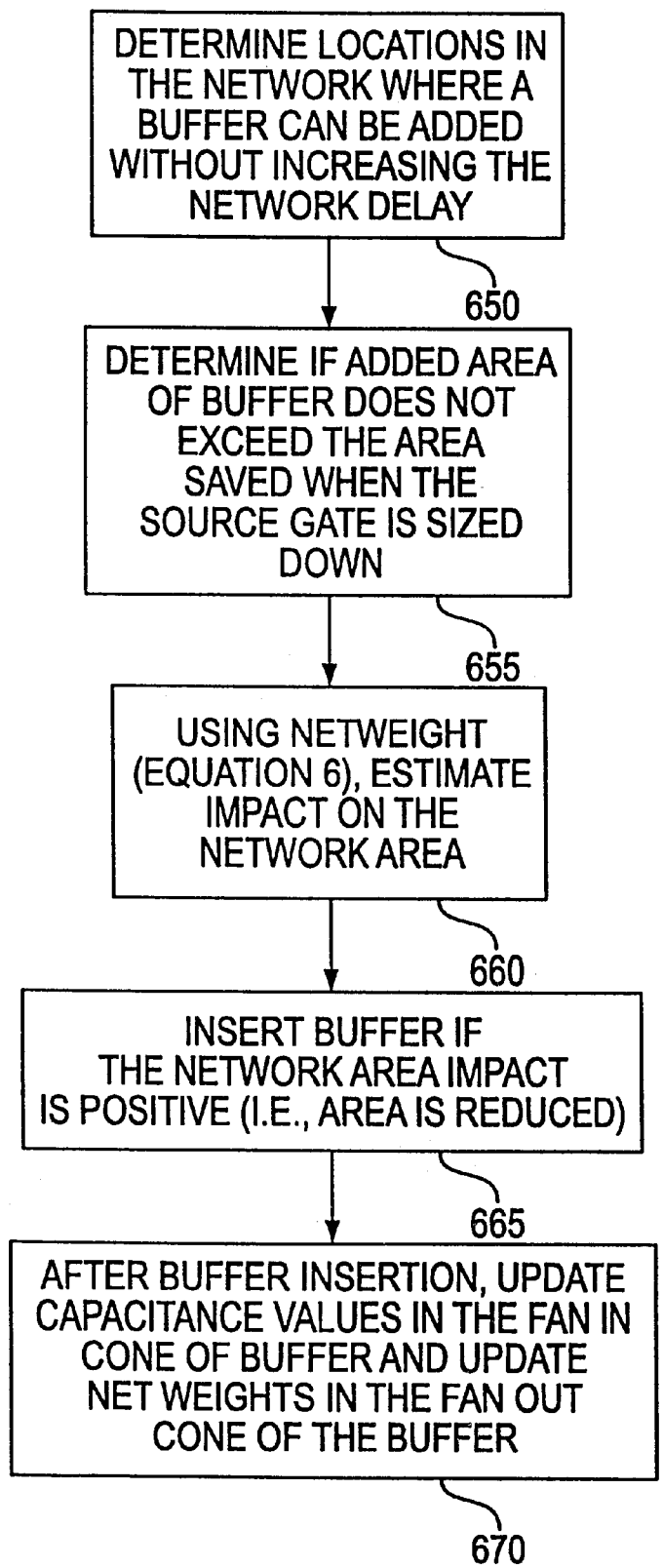
FIG. 8 is a flowchart describing a method of buffering according to the invention.

The buffering step of 215 (FIG. 4) is discussed in further detail with reference to FIG. 8. In step 650, locations in the circuit are determined where a buffer can be added so that buffer insertion will still permit timing constraints to be met. This determination is made by subtracting the delay of the buffer from the "local slack", to give the value of the predicted slack after buffer insertion. Slack is zero or positive if the timing constraints are met. In addition, all slacks in the circuit can be summarized by the "network slack" which is the single "worst" slack number. If the network slack is non-negative, then timing closure is achieved. If the predicted slack calculated in step 650 is larger than the network slack, then it is possible to insert a buffer without increasing the circuit delay.

In step 655, it is determined whether the added area due to buffer insertion does not exceed the area saved by sizing down the source gate. The added area (by inserting the buffer) is equal to the area of the buffer multiplied by the buffer size, wherein the buffer size is determined by the buffer load C divided by the typical load C/S on the buffer. The area saved by sizing down the source gate is determined by first calculating the change in net load due to the buffer insertion. This net load change is due to the following: (1) some sinks (which sink currents) are removed, (2) the input load of the buffer is added, and (3) the number of fanouts of the gate may change.

Using the net weight equation (6), the impact of buffer insertion on the work area can be estimated (step 660). In step 665, the buffer is inserted if the impact on the circuit area is positive (i.e., the circuit area is reduced). After the buffer has been inserted, then in step 670 the capacitance values need to be updated in the fanin cone of the buffer, while the net weights need to be updated in the fanout cone of the buffer. This updating step serves to keep the net weights accurate, while limiting the net weight re-calculation to those portions of the circuit affected by buffer insertion.

Figure 8A:
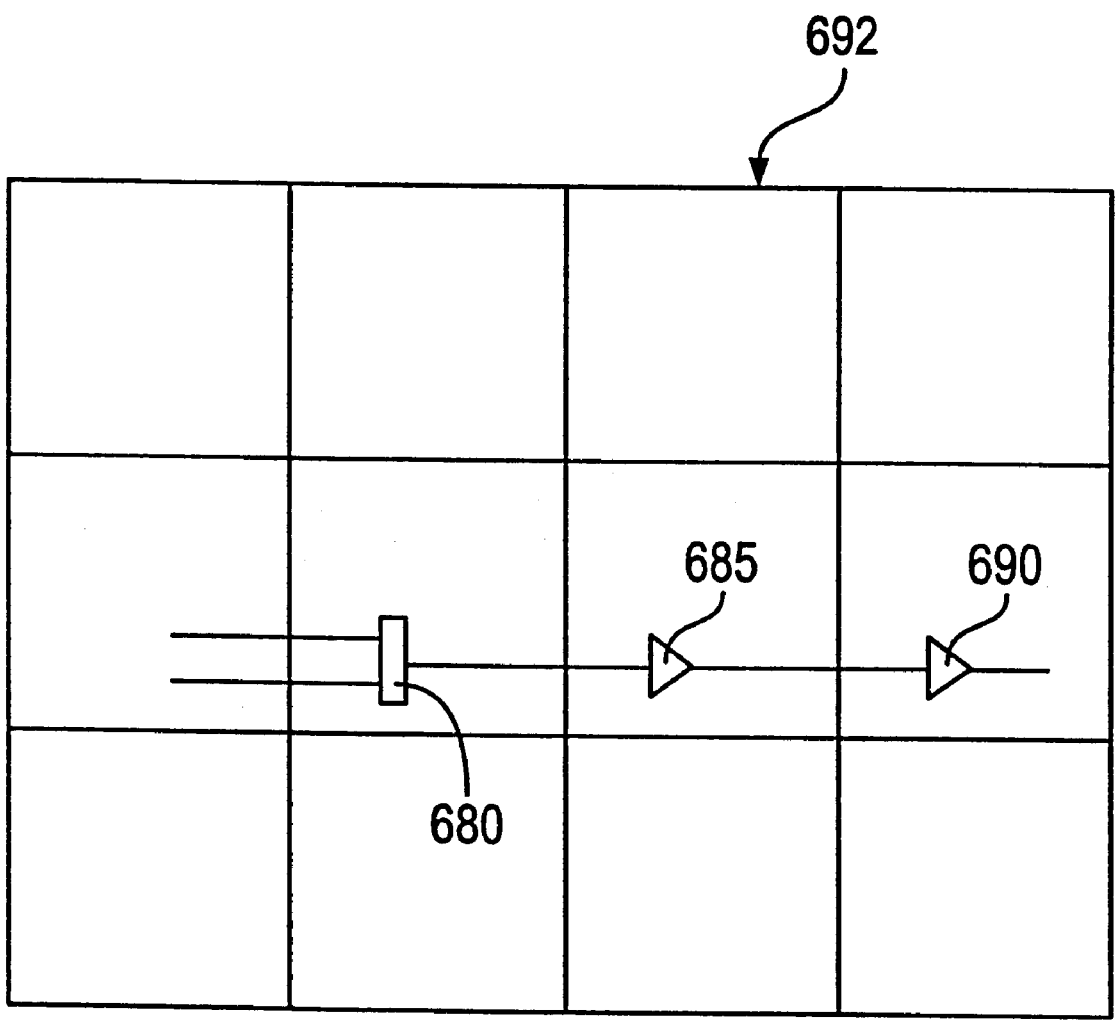
FIG. 8A is a schematic diagram of a portion of a digital circuit wherein buffers are inserted to optimize network area.

FIG. 8A shows a gate 680 which has buffers 685 and 690 inserted in the gate 680 output load. The buffers 685 and 690 permit the gate 680 to be sized down. The buffers 685 and 690 are inserted if the area impact on circuit 692 is positive (i.e., the area of circuit 692 is reduced due to buffering).

Buffer insertion is a method for optimizing the circuit area. As a result of buffer insertion, the timing of the circuit becomes slower, but the circuit timing will still meet the timing constraints. Buffer insertion causes the net delay to increase due to the added delay from the buffer. For those portions of the circuit where timing constraints have already been met, adding buffers can still result in meeting the previously determined timing constraints.

While it is preferred to stay within the timing constraints, it is within the scope of the present invention to go beyond the timing constraints and to correct the circuit later in the design process so that the timing constraints are eventually met. Additionally, where it is determined that saving area is of more significance than in meeting timing constraints, buffers can be inserted to save area, even though the previously determined timing constraints are not met. Many paths in a circuit do not have the critical timing requirements, and thus, buffers can be inserted in these paths to save area.

Compressing or Stretching of Gate Delays

Figure 9:
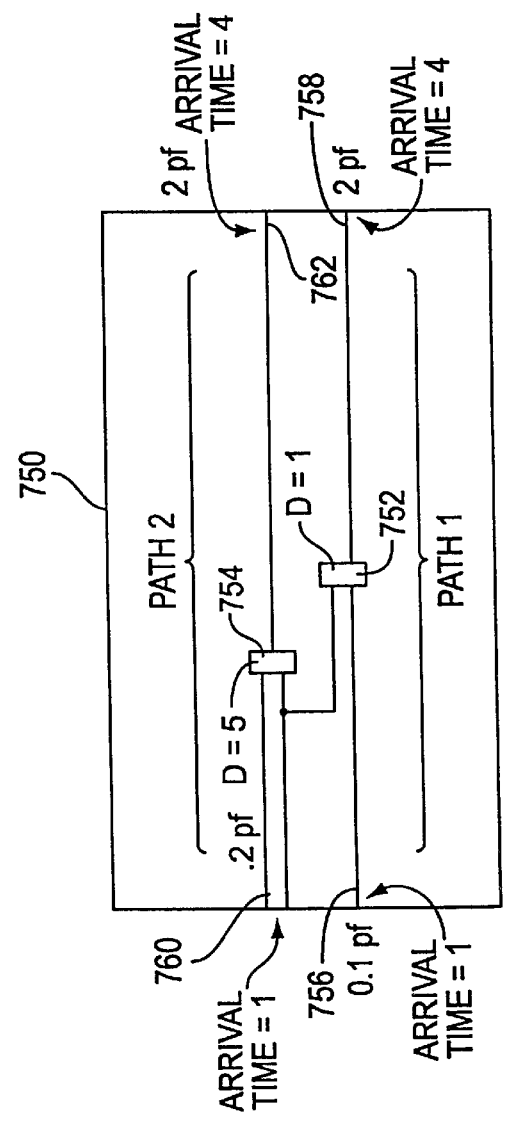
FIG. 9 is a schematic diagram of a portion of a digital circuit shown for describing a method for stretching and compressing of gate delays.
Figure 9A:
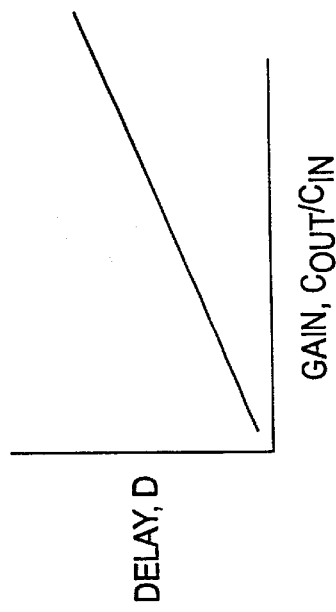
FIG. 9A is a graph showing the relationship between the gate gain $C_{out}/C_{in}$ and the gate delay D.

Prior to cell placement, the delays of the individual gates may be stretched or compressed to meet the delay constraints, as shown in step 220 of FIG. 4. As shown in FIG. 9A, by compressing (decreasing) the delay of a given gate, the gate gain decreases. Gates which are on long paths not meeting the delay constraints are compressed (in delay) until the long paths meet the delay constraints. The delay of the gates (or gate) may be decreased as long as the minimum required gain requirements are met.

By stretching (increasing) the delay of a given gate, the gate gain increases (see FIG. 9A). Gates on short paths which easily meet the delay constraints are stretched (in delay), since gates with stretched delays require less area for the same load. The delay of the gates (or gate) in a path are stretched to the extent that timing constraints for the digital circuit are still met.

The step of stretching and compressing of a gate delay is not related to the adjustment of gate sizes. As stated above, to stretch or compress the gate delay, the gate gain is appropriately adjusted. The stretching and compressing step is discussed in further detail with reference to FIG. 9 which shows a portion of a digital circuit 750. As an example, the gate 752 has a requirement of driving an output capacitance load ($C_{out}$) of about 2.0 pico-farads, while having an input capacitance load ($C_{in}$) of about 0.1 pico-farads. Thus the gain requirement of the gate 752 is $C_{out}/C_{in}$=2.0/0.1. The gate 754 is assumed to have an output capacitance load of about 2.0 pico-farads and an input capacitance load of about 0.2 pico-farads. Thus, the gain requirement of the gate 754 is 2.0/0.2.

It is also assumed that the gate 752 has a delay, D=1. It is assumed further that the gate 752 is on a "Path 1" which has an arrival time requirement of about 1 at its beginning point 756 and an arrival time requirement of about 4 at its end point 758. Thus, the delay constraint for Path 1 is equal to about 3, as shown by equation (9):

$$\text{constraint} = \text{arr. time (point } \mathbf{756}) - \text{arr. time (point } \mathbf{758}) = 4 - 1 = 3 \quad (9)$$

Since the delay D of gate 752 equals 1 and the delay constraint of Path 1 equals 3, the slack for Path 1 equals 2, as shown by equation (10):

$$\text{slack} = \text{delay constraint} - \text{gate(s) delay(s)} = 3 - 1 = 2 \quad (10)$$

It is further assumed that the gate 754 has a delay, D=5. It is assumed further that the gate 754 is on a "Path 2" which has an arrival time requirement of about 1 at its beginning point 760 and an arrival time requirement of about 4 at its end point 762. Thus, the delay constraint for Path 2 is equal to about 3, as shown by equation (11):

$$\text{constraint}=\text{arr. time (point 760)}-\text{arr. time (point 762)} =4-1=3 \quad (11)$$

Since the delay of gate 754 (D=5) is greater than the Path 2 delay constraint of 3, the delay of gate 754 does not meet the timing constraints.

The invention operates on a path-by-path basis whereby the most critical path in a digital circuit 750 is evaluated first. Thus, Path 1 is evaluated first if it is the most critical path. Path 2 is evaluated first if it is the most critical path. Assuming Path 2 is the most critical path, then the delay of the gate 754 is compressed to meet the Path 2 delay constraint of 3, while observing the effects on the gain of the gate 754. As stated above, the gain requirement of the gate 754 is $C_{out}/C_{in}$=2.0/0.2. However, as shown in FIG. 9A, the gain of any particularly sized gate decreases as the gate delay D is decreased. Thus, compression of the gate 754 delay may be limited by its gain requirements.

After the gate 754 has been adjusted to meet the Path 2 timing constraints, it becomes "locked," whereby the gate 754 delay will not be adjusted further for the remainder of the compression and stretching step. It is further noted that if a path contains more than one gate, then, preferably, their delays are compressed (or stretched) in equal amounts to meet the path timing constraints. For example, assume that four (4) gates are in a given path and two (2) nano-seconds of delay can be added to the given path. Then according to a preferred embodiment of the invention, 0.5 nano-seconds of delay can be added to each of the four (4) gates to equally distribute the two nano-seconds of delay which is to be added in the given path.

The invention then proceeds to evaluate the next critical path. Assume that Path 1 is the next most critical path. In FIG. 9, the delay of gate 752 (D=1) meets the Path 1 delay constraint of 3, and thus the gate 752 delay can be stretched based on a slack of 2. The gate 752 is then locked after its delay is stretched. If a plurality of gates are on Path 1, then preferably, their delays are stretched in equal amounts.

The invention will then evaluate the next critical path, whereby gate delays may be stretched or compressed. When reducing slack values during the gate delay stretching step, it is preferable to maintain a small amount of slack for a path, in order to compensate for downstream delay effects, such as wire delay. Additionally, in some instances, library rules may limit the amount of slack value reduction.

Figure 9B:
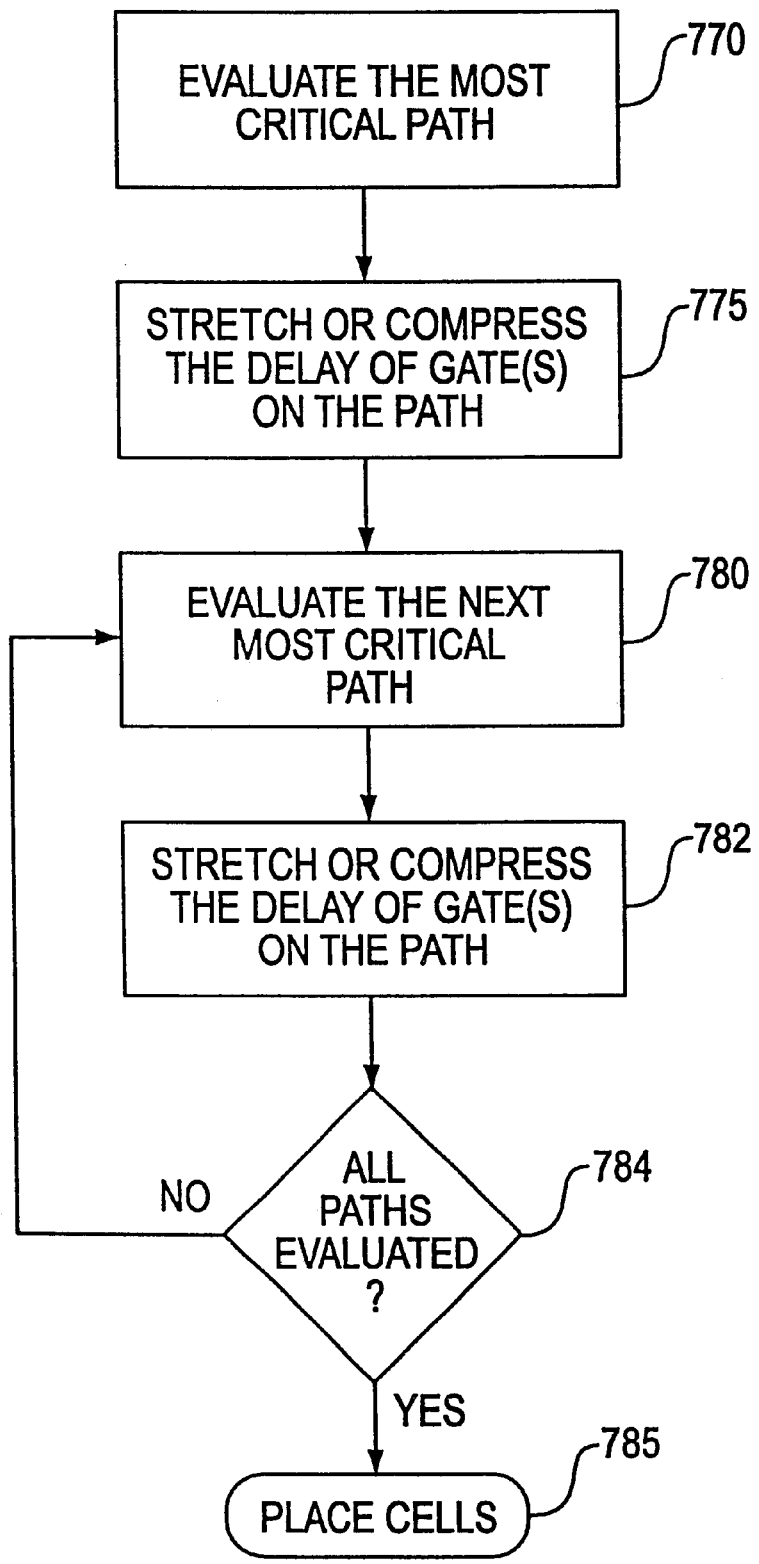
FIG. 9B is a flowchart describing a method for stretching and compressing gate delays according to the present invention.

For the purpose of stretching and compressing, registers in the circuit are preferably considered as part of a path from which they originate, but not part of the path from which they terminate. The stretching and compressing steps are further shown in the flowchart of FIG. 9B. In step 770, the most critical path on the circuit is evaluated, and in step 775, the delay of a gate (or gates) in the path are stretched or compressed. In step 780, the next critical path is evaluated, and in step 782, the delay of a gate (or gates) in the path are stretched or compressed. In step 784, if all paths have not been evaluated, then the invention returns to step 780 to evaluate the next critical path. If in step 784 all paths have been evaluated, then the invention proceeds to step 785 wherein placing of cells may be performed.

Cell Placement

Figure 10C:
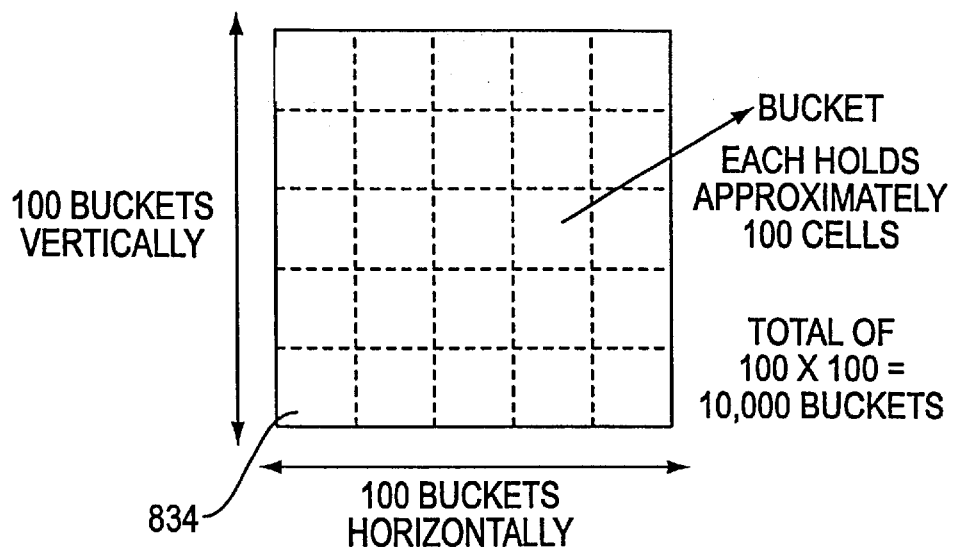
FIG. 10C is a partial top elevational view of a plurality of "buckets" wherein cells are placed inside the buckets.
Figure 10A:
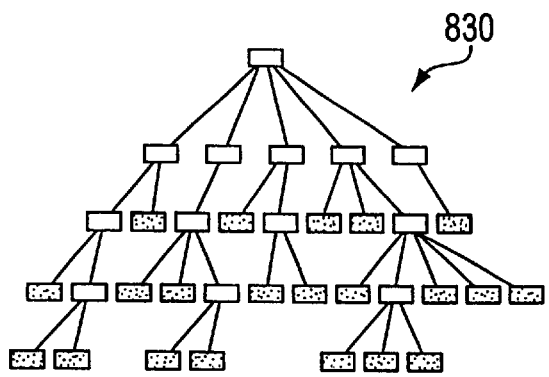
FIG. 10A is a schematic block diagram of a logical hierarchy of a network according to the invention.
Figure 10B:
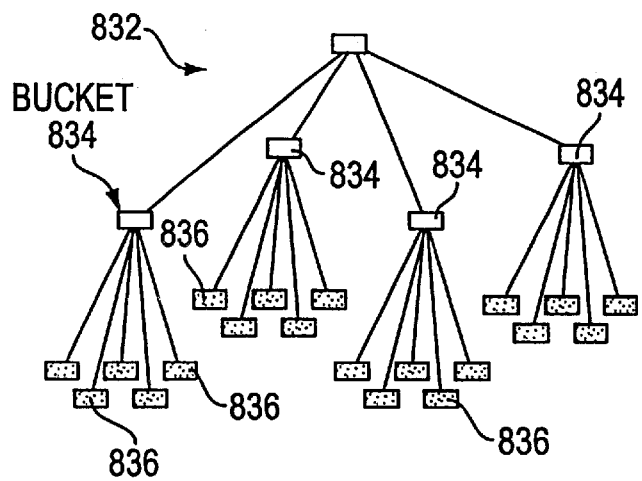
FIG. 10B is a schematic block diagram of a physical hierarchy of a network transformed from the logical hierarchy of FIG. 10A.

In step 225 (FIG. 4), the placement of cells is performed. FIGS. 10A and 10B show how a circuit design is transformed from a logical hierarchy 830 to a physical hierarchy 832 during the cell placement step 225 (FIG. 4). In the physical hierarchy 832, the intermediate logic levels in the logical hierarchy 830 are associated in or grouped in buckets 834 wherein each bucket 834 holds, for example, about one-hundred (100) cells 836. The buckets 834 are arranged in an array as shown in FIG. 10C. If the designer chooses to keep a group of cells 836 together, then the group of cells 836 are grouped in the same buckets 834 or in neighboring buckets. Preferably, a bucket 834 is sized small enough such that cell placement within a bucket 834 has an insignificant effect on timing. In other words, the size of a bucket 834 is such that the wire delay in a bucket 834 can be ignored. However, the size of a bucket 836 should be large enough to accommodate remapping and resizing of the cells 836 contained in the bucket. The number of cells which can be placed within a bucket can range, preferably, from about 20 cells to about 200 cells.

Pre-routes and pre-places (for driving the placer and global router) are driven into the bucket 834 structure. It is further noted, however, that the present invention may be practiced or incorporated with conventional placement methods and systems.

According to the present invention, timing closure is maintained after placement occurs of cells 836. To maintain timing closure, the size of a particular gate may be adjusted during or after placement. This adjustment compensates for the fact that placement algorithm may assign different net lengths to different nets, and that these different net lengths are difficult to predict prior to the placement step. Thus, by the practice of the present invention, the gate sizes are adjusted in order to maintain the delay values which were determined prior to placement.

In contrast, conventional placement methods optimize the length of wires to compensate for changes in delays, due to net length changes caused by the placement algorithm. Thus, conventional placement methods involve costly and lengthy delay analysis avoided by the present invention.

As stated above, equation (8) determines the cell area of the placed cells:

$$A=\Sigma(w_i)(\omega_i) \quad (8)$$

As also stated above, the parameter $\omega_i$ represents the wire load for a given gate (e.g., gate i). Based on equation (8), the area for each gate is determined based on the product, $(w_i)(\omega_i)$. Thus, a given gate i can be sized appropriately, and avoidance is possible of the costly delay analysis required in conventional methods when the actual net lengths differ from the estimated net lengths prior to placement.

Routing of the Digital Circuit

Figure 11:
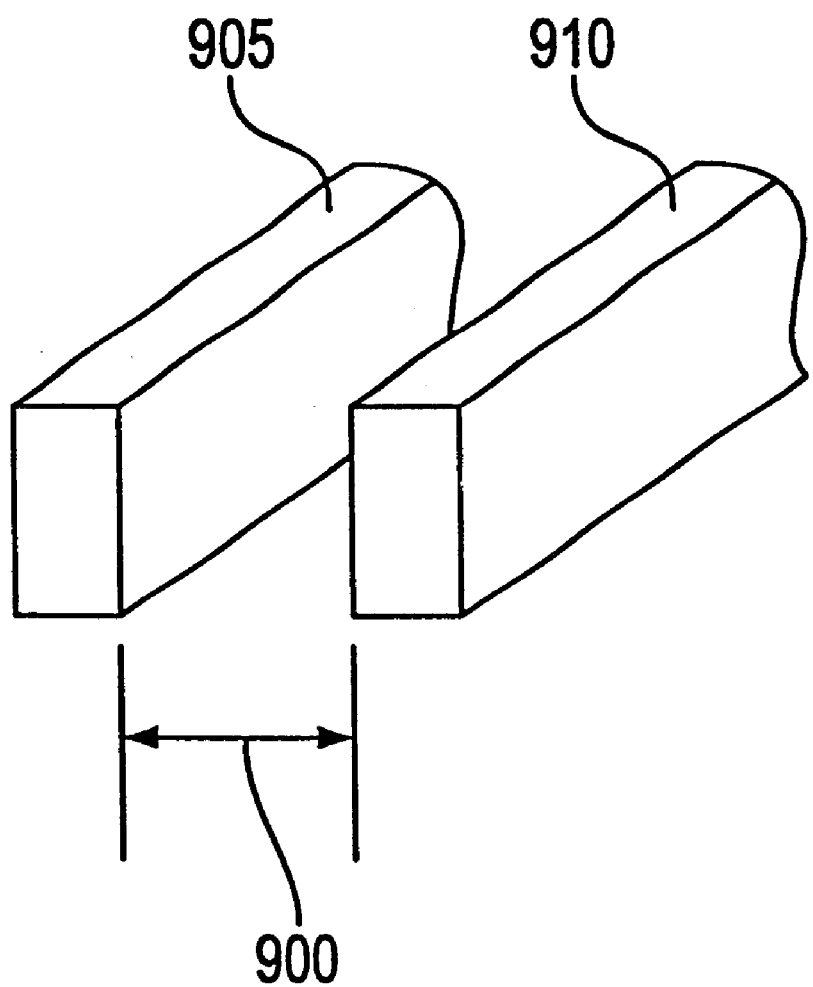
FIG. 11 is a partial perspective view of two wires in a net shown for describing adjustment of capacitive load values to control timing constraints after routing.

Finally, in step 230 (FIG. 4), routing of the placed circuit is performed to complete the chip layout 235. The routing step places wires which were previously determined during or prior to the placement step. In step 230, gate delay and gate size are fixed. The router thus controls the wire loads to maintain the delay as essentially constant and thus achieve timing closure. Gate delay and gate size have been previously fixed. The router thus controls the distance 900 (FIG. 11) between, for example, wires 905 and 910. The capacitance between the two wires 905 and 910 decreases as the distance 900 between wires increases. A conventional router can be used to control the distance 900.

This specification shows the components (e.g., buffers, cells, nets) which exist when the integrated circuit layout is produced. However, it is realized by those skilled in the art that when performing the steps in accordance with the present invention prior to producing the layout, the shown components are data representation stored in the computer and not the actual devices.

Thus, while the present invention has been described herein with reference to particular embodiments thereof, a latitude of modification, various changes and substitution are intended in the foregoing disclosure, and it will be appreciated that in some instances some features of the invention will be employed without a corresponding use of other features without departing from the scope of the invention as set forth.

What is claimed is:

1. An automated method for designing an initial integrated circuit layout of a digital circuit with a computer, based upon an electronic circuit description and by using a cell library containing cells, comprising the steps of:
   (a) selecting a plurality of cells from the cell library that are intended to be coupled to each other with a plurality of wires and that can be used to implement the digital circuit based on the electronic circuit description input to the computer to obtain a selected plurality of cells, at least some of the selected plurality of cells having an initial intended delay associated therewith for ensuring that predetermined timing constraints are met;
   (b) determining a placement of the selected plurality of cells and the wires coupled thereto using a sequence of instructions from the computer program; and
   (c) determining the area of the some cells, the area of each some cell being determined using the lengths of the wires coupled to each of said some cells such that the initial intended delay of each some cell is realized, the length of each wire being determined by the placement of the cells coupled to that wire.

2. The automated method of claim 1 further comprising:
   routing the digital circuit to generate the integrated circuit layout.

3. The automated method of claim 2 wherein,
   prior to the step of routing, the area and placement of each of the selected plurality of cells and the lengths of the wires is finalized.

4. The method of claim 1 wherein the plurality of cells are coupled to each other based on the electronic circuit description input to the computer.

5. The automated method of claim 1 wherein each of the plurality of wires has an associated capacitive load value; and
   wherein each wire is associated with a net weight value that represents the sensitivity of the total area of the digital circuit of step (a) with respect to the associated capacitive load value of the wire.

6. The automated method of claim 5 wherein the net weight $w_i$ of the wire coupled to a selected cell is:

$$w_i = \delta A / \delta C_i$$

where A is the total area of the digital circuit of step (a) and $C_i$ is the associated capacitive load of the wire coupled to the selected cell.

7. The automated method of claim 6 wherein the determined areas of said some selected cells are chosen based upon the product of the net weight $w_i$ and the net load $C_i$ in order to meet said predetermined timing constraints.

8. The automated method of claim 1 wherein all of the selected cells have an initial intended delay associated therewith.

9. The automated method of claim 8 wherein the step of determining determines the area of all of the selected cells.

10. The automated method of claim 1 further comprising step of inserting a buffer in one of the wires after the step of determining the placement and before the step of determining the area.

11. The automated method of claim 10 wherein the step of inserting the buffer comprises:
    determining the wire into which a the buffer can be inserted while still meeting the predetermined timing constraints; and
    inserting the buffer into the wire if area will be saved by the insertion.

12. The automated method of claim 1 further comprising:
    stretching the initial intended delay of a selected cell to decrease the area of the selected cell after the step of determining the placement and before the step of determining the area.

13. The automated method of claim 1 further comprising:
    stretching the initial intended delays of a plurality of selected cells coupled to each other to decrease the area of each of the coupled cells after the step of determining the placement and before the step of determining the area.

14. The automated method of claim 1 further comprising:
    compressing the initial intended delay of a selected cell after the step of determining the placement and before the step of determining the area.

15. The automated method of claim 14 wherein the compressing step is limited by a gain requirement of the selected cell.

16. The automated method of claim 1 further comprising:
    compressing the initial intended delays of a plurality of the selected cells after the step of determining the placement and before the step of determining the area.

17. The automated method of claim 1 wherein a group of said some cells are assigned in buckets and operated upon.

18. The automated method of claim 17 wherein the group of said some cells ranges from 20 to 200 cells.

19. An integrated circuit layout produced in accordance with the automated method of claim 1.

20. The method according to claim 1 wherein the cell library for each of the some cells selected does not include the area of each of the some cells.

21. An automated method for designing an integrated circuit layout using a computer, based upon an electronic circuit description and based upon cells which are selected from a cell library, comprising the steps of:
    (a) placing each of the cells in the integrated circuit layout and wires associated therewith so that the cells can be coupled together by wires to form a circuit path having an associated predetermined timing constraint wherein the cells are coupled together by wires based upon the electronic circuit description input to the computer, the electronic circuit description including an initial intended delay associated with each cell; and
    (b) determining an area of at least some of the cells to satisfy the associated predetermined timing constraint of the circuit path, the area being determined as a function of the ratio of the input capacitance and output capacitance of the wires coupled to each of said some cells such that the initial intended delay of each cell is realized.

22. The automated method of claim 21 wherein each of the wires has an associated capacitive load value; and
    wherein each wire is associated with a net weight value that represents the sensitivity of the total area of the integrated circuit layout with respect to the associated capacitive load value of the wire.

23. The automated method of claim 22 wherein the net weight $w_i$ of the wire coupled to a cell is:

$$w_i = \delta A / \delta C_i$$

where A is the total area of the integrated circuit layout and $C_i$ is the associated capacitive load of the wire coupled to the cell.

24. The automated method of claim 23 wherein the areas of at least some of the cells are chosen based upon the product of the net weight $w_i$ and the net load $C_i$ in order to meet said predetermined timing constraints.

25. The automated method of claim 24 wherein the length of each wire is determined by the placement of the cells coupled to that wire.

26. The automated method of claim 21 wherein the length of each wire is determined by the placement of the cells coupled to that wire.

27. The automated method of claim 21 further comprising:
inserting a buffer in one of the wires after the step of placing and before the step of determining the area.

28. The automated method of claim 21 further comprising:
stretching the associated relative delay value of a selected cell after the step of placing and before the step of determining the area.

29. The automated method of claim 21 further comprising:
compressing the associated relative delay value of a selected cell after the step of placing and before the step of determining the area.

30. The automated method of claim 29 wherein the compressing step is limited by a gain requirement of the selected cell.

31. The automated method of claim 21 wherein a group of said some cells are assigned in buckets and operated upon in order to determined the initial intended area of each of the group of said some cells.

32. The automated method of claim 31 wherein the group of said some cells ranges from 20 to 200 cells.

33. The automated method of claim 21 wherein the step of determining determines the area of all of the selected cells.

34. The method according to claim 21 wherein the electronic circuit description used to placing each of the cells in the integrated circuit layout does not include the area of the cells.

35. An automated method for designing an integrated circuit layout of a circuit of at least four cells coupled to each other with a plurality of wires by using a computer and based upon an electronic circuit description containing information on the digital circuit, comprising the steps of:
(a) selecting a plurality of cells which can be used to implement the digital circuit based upon the electronic circuit description, each of the plurality of cells having an associated load and an initial intended delay associated therewith for ensuring that predetermined timing constraints are met, the selected plurality of cells comprising at least a first cell having a first load, a second cell having a second load, a third cell having a third load, and a fourth cell having a fourth load;
(b) determining initial placement locations for each of the selected plurality of cells, including the first cell, the second cell, the third cell, and the fourth cell;
(c) setting the size of each of the selected plurality of cells and the loads of each cell so that the predetermined timing constraints are met, the size of each cell being determined using the lengths of the wires coupled to each of said cells such that the initial intended delay of each cell is realized, the length of each wire being determined by the placement of the cells coupled to that wire.

36. The automated method of claim 35 wherein each of the load has an associated capacitive load value; and
wherein each load is associated with a net weight value that represents the sensitivity of the total area of the integrated circuit layout with respect to the associated capacitive load value of the load.

37. The automated method of claim 36 wherein the net weight $w_i$ of the load coupled to a cell is:

$$w_i = \delta A / \delta C_i$$

where A is the total area of the integrated circuit layout and $C_i$ is the associated capacitive load of the load coupled to the cell.

38. The automated method of claim 37 wherein the areas of at least some of the cells are chosen based upon the product of the net weight $w_i$ and the net load $C_i$ in order to meet said predetermined timing constraints.

39. The method according to claim 35 wherein the plurality of cells are selected without having a size associated therewith.

40. A method according to claim 35 in which each of the first, second, third and fourth cells implement at least one logic operation.

41. A method according to claim 35 which none of the first, second, third and fourth cells are buffers.

42. An integrated circuit layout produced in accordance with the automated method of claim 35.

43. An automated method for determining an integrated circuit layout of at least four cells by using a computer and based upon an electronic circuit description containing information on the digital circuit, the automated method comprising the steps of:
(a) selecting a plurality of cells which can be used to implement the digital circuit using the electronic circuit description, the plurality of cells comprising a first cell having a first load and a first initial intended delay, a second cell connected to the first cell and having a second load and a second initial intended delay associated therewith, a third cell connected to the second cell and having a third load and a third initial intended delay associated therewith, and a fourth cell connected to the third cell and having a fourth load and a fourth initial intended delay associated therewith, the digital circuit having predetermined timing constraints;
(b) determining the placement locations for each of the selected plurality of cells including the first cell, the second cell, the third cell, and the fourth cell and wires associated therewith;
(c) selecting the size of the first cell based on the first load of the first cell so that the first initial intended delay is realized, the size of the first cell being determined using the lengths of the wires coupled to the first cell, the length of each wire being determined by the placement of the cells coupled to that wire;
(d) selecting the size of the second cell based on the second load of the second cell so that the second initial intended delay is realized, the size of the second cell being determined using the lengths of the wires coupled to the second cell, the length of each wire being determined by the placement of the cells coupled to that wire;

(e) selecting the size of the third cell based on the third load so that the third initial intended delay is realized, the size of the third cell being determined using the lengths of the wires coupled to the third cell, the length of each wire being determined by the placement of the cells coupled to that wire; and (f) selecting the size of the fourth cell based on the fourth load so that the fourth initial intended delay is realized, the size of the fourth cell being determined using the lengths of the wires coupled to the fourth cell, the length of each wire being determined by the placement of the cells coupled to that wire, wherein the selection of the area of the first, second, third and fourth cells ensures that the predetermined timing constraints associated therewith are met.

44. An integrated circuit layout produced in accordance with the automated method of claim 43.

45. A method according to claim 43 further including the step of routing the digital circuit.

46. A method according to claim 43 in which each of the first, second, third and fourth cells implement at least one logic operation.

47. A method according to claim 43 in which none of the first, second, third and fourth cells are buffers.

48. The method according to claim 43 wherein the plurality of cells are selected without having a size associated therewith.

49. An automated method of modeling the delay of the cells of an integrated circuit comprising the steps of:

associating an initial gain value with each cell that has been initially selected for inclusion in the integrated circuit;

computing the initial intended delay value of each cell based on the initial intended gain value.

50. The automated method of claim 49, wherein the initial intended gain value is determined such that the variation in the variable component of the initial intended delay is the same for all the cells in the circuit is minimized.

51. The automated method of claim 49, wherein the associated gain value of one or more cells are reduced to compress the associated relative delay value of said cells to assist in satisfying the predetermined timing constraints.

52. The automated method of claim 49, wherein the associated gain value of one or more cells are increased to stretch the associated relative delay value of said cells to assist in reducing the area of said cells.

53. The automated method of claim 52, further including the step of computing the input capacitance of each cell, the input capacitance being computed as the capacitive output load of said cell divided by the gain.

54. The automated method of claim 53, further including the step of computing the area of each cell, the area of each cell being computed as the capacitive output load of said cell times the net weight of each cell.

* * * * *

(12) EX PARTE REEXAMINATION CERTIFICATE (6950th)
United States Patent
van Ginneken

(10) Number: US 6,453,446 C1
(45) Certificate Issued: Jul. 21, 2009

(54) TIMING CLOSURE METHODOLOGY

(75) Inventor: Lukas P. P. P. van Ginneken, San Jose, CA (US)

(73) Assignee: Synopsys, Inc., Mountain View, CA (US)

Reexamination Request:
No. 90/008,182, Nov. 10, 2006

Reexamination Certificate for:
Patent No.: 6,453,446
Issued: Sep. 17, 2002
Appl. No.: 09/054,379
Filed: Apr. 2, 1998

Related U.S. Application Data

(60) Provisional application No. 60/068,827, filed on Dec. 24, 1997.

(51) Int. Cl.
*G06F 17/50* (2006.01)

(52) U.S. Cl. .......................... 716/3; 716/2; 716/6; 716/9
(58) Field of Classification Search ........................ None
See application file for complete search history.

(56) References Cited

PUBLICATIONS (Exhibit F) Kannan, Lalgudi; Suaris, Peter.; Fang, Hong–Gee, "A Methodology and Algorithms for Post–Placement Delay Optimization," 31st ACM/IEEE Design Automation Conference, 1994, pp. 327–332. ("Kannan et al.").

(Exhibit G) Chuang, Weitong; Hajj, Ibrahim, "Delay and Area Optimization for Compact Placement by Gate Resizing and Relocation," IEEE International Conference on Computer–Aided Design (ICCAD'94), Nov. 1994, pp. 145–148. ("Chuang et al.").

(Exhibit H) Lin, Shen; Marek–Sadowska, Margaret; Kuh, Ernest S., "Delay and Area Optimization in Standard–Cell Design," 27th ACM/IEEE Design Automation Conference, 1990, pp. 349–352. ("Lin et al.").

(Exhibit I) Mains, Robert E. and Mosher, Thomas A., "Timing Verification and Optimization for the PowerPC Processor Family," Proceedings, IEEE International Conference on Computer Design: VLSI in Computers and Processors, 1994, pp. 390–393. ("Mains et al.").

(Exhibit J) Menezes, Noel; Pullela, Satyamurthy; Pileggi, Lawrence T., "Simultaneous Gate and Interconnect Sizing for Circuit–Level Delay Optimization," 32nd ACM/IEEE Design Automation Conference, 1995. ("Menezes et al.").

(Exhibit K) Sarrafzadeh, Majid; Wong, C.K., "An Introduction to VLSI Physical Design," The McGraw Hill Companies, Inc., 1996, pp. 155–175. ("Sarrafzadeh et al.").

(Exhibit L) Youssef, Habib; Shragowitz, Eugene, "Bounds on Net Delays for VLSL Circuits," IEEE Transactions on Circuits and Systems—II: Analog and Digital Signal Processing (vol. 39, No. 11) Nov. 1992, pp. 815–824. ("Youssef et al.").

(Exhibit M) Cong, Jason; He, Lei, Koh; Cheng–Kok; Madden, Patrick, H., "Performance Optimization of VLSI Interconnect Layout," Integration, the VLSI Journal (vol. 21, No. 1), Nov. 1996, pp. 1–94. ("Cong et al.").

(Continued)

*Primary Examiner*—Scott L. Weaver

(57) ABSTRACT

An automated method for designing an integrated circuit layout using a computer based upon an electronic circuit description and based upon cells which are selected from a cell library, each of the cells having an associated area, comprising the steps of: (a) placing each of the cells in the integrated circuit layout so that the cells can be coupled together by wires to form a circuit path having an associated predetermined delay constraint wherein the cells are coupled together based upon the electronic circuit description input to the computer; (b) connecting the cells together with the wires to form the circuit path; and (c) adjusting an area of at least one of the cells to satisfy the associated predetermined delay constraint of the circuit path.

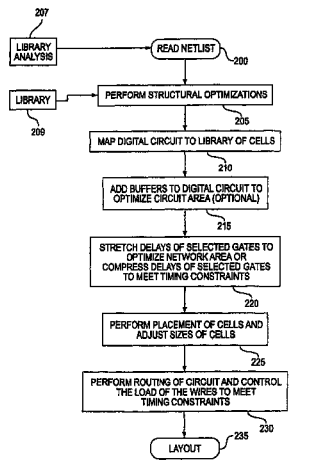

PUBLICATIONS (Exhibit N) Grodstein, J.; Lehman, E.; Harknes, H.; Grundmann, B.; Watanabe, Y., "A Delay Model for Logic Synthesis of Continuously–sized Networks," Digest Int. Conf. on Computer Aided Design, pp. 458–462, San Jose, Nov. 5–9, 1995 ("Grodstein et al.").

(Exhibit O)(Sutherland, I.; Sproull, R. "The Theory of Logical Effort: Designing for speed on the back of an envelope," Advanced Research in VLSI, pp. 3–16, UC Santa Cruz, 1991 ("Sutherland et al.").

(Exhibit P) "Embedded Tutorial: Speed: New Paradigms in Design for Performance," Advance Program: ICCAD '96 (1996 International Conference on Computer–Aided Design, Nov. 10–14, 1996, San Jose, CA), SIGDA Newsletter, vol. 26, No. 2, p. 45 ("ICCAD '96 Advance Program").

(Exhibit Q) van Ginneken, Lukas P.P.P., "Buffer Placement in Distributed RC–tree Networks for Minimal Elmore Delay," IEEE International Symposium on Circuits and Systems, 1990 ("van Ginneken").

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–54 are cancelled.

* * * * *